United States Patent [19]

Kaneko et al.

[11] Patent Number: 5,666,217

[45] Date of Patent: Sep. 9, 1997

[54] LIQUID CRYSTAL DEVICE

[75] Inventors: Shuzo Kaneko, Chigasaki; Ihachiro Gofuku, Atsugi; Etsuro Kishi, Sagamihara; Makoto Kojima, Atsugi; Katsutoshi Nakamura, Hiratsuka, all of Japan

[73] Assignee: Canon Kabushiki Kaisha, Tokyo, Japan

[21] Appl. No.: 509,929

[22] Filed: Aug. 1, 1995

[30] Foreign Application Priority Data

| Aug. 4, 1994 | [JP] | Japan | 6-183411 |
| Jan. 20, 1995 | [JP] | Japan | 7-007390 |
| Jan. 20, 1995 | [JP] | Japan | 7-007422 |
| Jan. 23, 1995 | [JP] | Japan | 7-008188 |
| Jan. 24, 1995 | [JP] | Japan | 7-008955 |

[51] Int. Cl.$^6$ .................................. G02F 1/1333
[52] U.S. Cl. .................................. 349/122; 349/138
[58] Field of Search .................................. 359/74, 79, 100

[56] References Cited

U.S. PATENT DOCUMENTS

| 4,367,924 | 1/1983 | Clark et al. | 350/334 |
| 4,662,721 | 5/1987 | Harada et al. | 350/339 |
| 4,796,979 | 1/1989 | Tsuboyama | 350/350 S |
| 4,796,980 | 1/1989 | Kaneko et al. | 350/350 S |
| 4,932,757 | 6/1990 | Hanyu et al. | 359/75 |
| 5,066,107 | 11/1991 | Yoshinaga et al. | 359/45 |
| 5,082,587 | 1/1992 | Janulis | 252/299.01 |
| 5,153,755 | 10/1992 | Higa | 359/75 |
| 5,262,082 | 11/1993 | Janulis et al. | 252/299.01 |
| 5,270,844 | 12/1993 | Maruyama et al. | 359/79 |
| 5,321,538 | 6/1994 | Maruyama et al. | 359/79 |
| 5,327,272 | 7/1994 | Fujiwara et al. | 359/75 |
| 5,381,256 | 1/1995 | Hanyu et al. | 359/75 |
| 5,400,159 | 3/1995 | Takao et al. | 359/76 |

FOREIGN PATENT DOCUMENTS

| 61-020930 | 1/1986 | Japan . |
| 62-235928 | 10/1987 | Japan . |
| 63-121020 | 5/1988 | Japan . |
| 63-163425 | 6/1988 | Japan . |
| 63-228130 | 9/1988 | Japan . |
| WO22396 | 11/1993 | WIPO . |

OTHER PUBLICATIONS

Escher et al. "Impact of Tonic Impurities on the Performance of SSFLC–Displays—a Quantitative Analysis" 1989.

Mugridge et al. "Transit Times of Native Ions in Ferroelectric Liquid Crystals for High–Resolution Display Panels" 1992.

M. Schadt and W. Helfrich, "Voltage–Dependent Optical Activity of a Twisted Nematic Liquid Crystal," Feb. 15, 1971, pp. 127–128, Applied Physics Letters, vol. 18, No. 4.

Eiji Itoh et al., Electrostatic phenomena in polyimide Langmuir–Blodgett films, 1994, pp. 147–158, Journal of Electrostatics, vol. 33.

Y. Kitazaki and T. Hata, Extension of Fowkes' Equation and Estimation of Surface Tension of Polymer Solids, 1972, pp. 9–20, Journal of the Adhesion Society of Japan, vol. 8, No. 3.

Itoh et al., "Electrostatic Phenomena in Polyimide Langmuir–Blodgett Films", Journal of Electrostatics 33 (1994) 147–158.

Primary Examiner—William L. Sikes
Assistant Examiner—James A. Dudek
Attorney, Agent, or Firm—Fitzpatrick, Cella, Harper & Scinto

[57] ABSTRACT

A liquid crystal device is constituted by a pair of oppositely disposed substrates including a first substrate having a uniaxial alignment characteristic and a second substrate having a non-uniaxial alignment characteristic and a liquid crystal disposed between the first and second substrates. The first and second substrates are controlled to have surface potentials providing a difference therebetween of less than 50 mV in terms of an absolute value at their liquid crystal-contacting surfaces. As a result, the liquid crystal device is provided with an improved symmetry of switching threshold while retaining a good liquid crystal alignment characteristic.

57 Claims, 8 Drawing Sheets

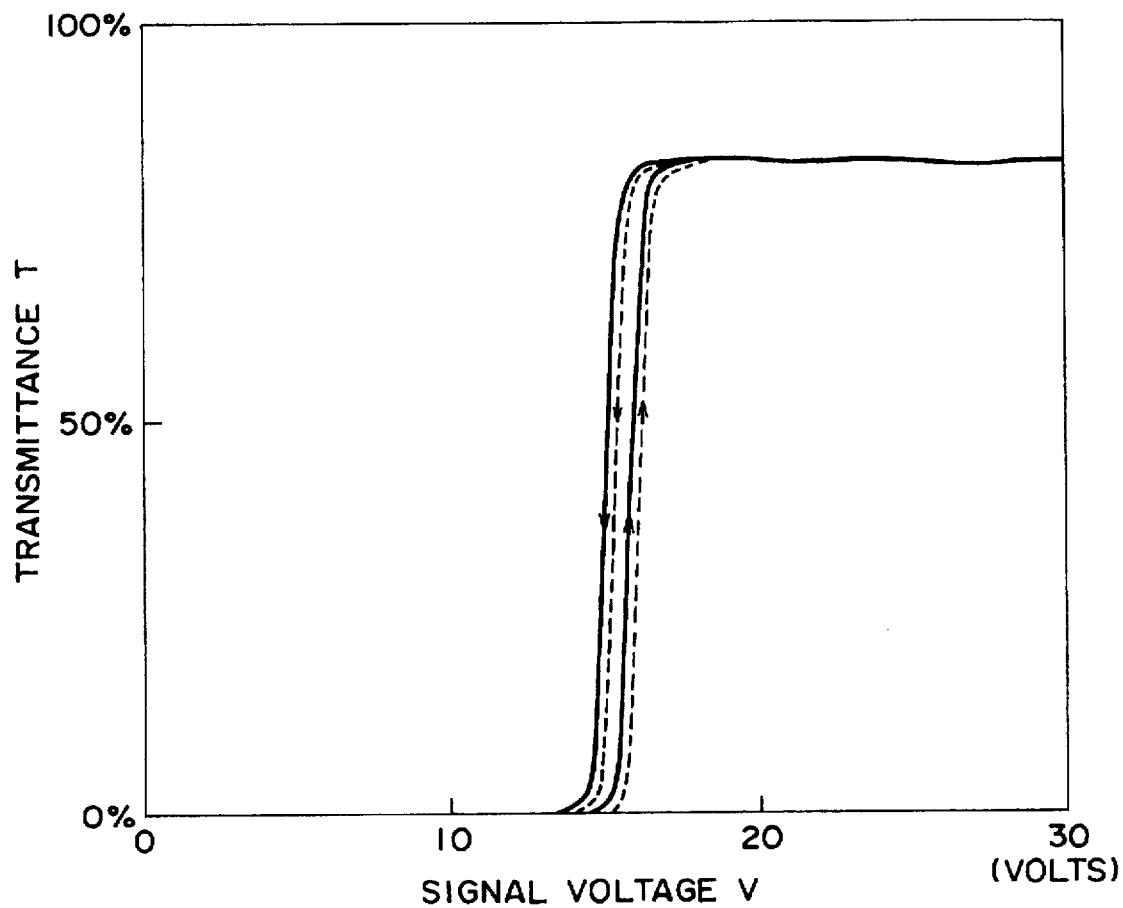
F I G. 14

LIQUID CRYSTAL DEVICE

FIELD OF THE INVENTION AND RELATED ART

The present invention relates to a liquid crystal device, i.e., an optical modulation device using a liquid crystal as an optical modulation substance, for use in a terminal display for computers, wordprocessors and type writers, television receivers, a view finder for video cameras, a light valve for projectors, a light valve for liquid crystal printers, etc., particularly a liquid crystal device using a chiral smectic-phase liquid crystal driven by utilizing a spontaneous polarization such as a ferroelectric liquid crystal and an anti-ferroelectric liquid crystal and capable of exhibiting good display characteristics.

There has been known a CRT as the hitherto most widely used display device, which has been widely used for outputting TV and VTR motion pictures or as a monitor device for personal computers. The CRT however has inferior stable picture characteristics, such as a low observability due to flicker or occurrence of scanning fringes caused by insufficient resolution, and deterioration of the fluorescent tube because of burning. Recently, it has been also found that electromagnetic wave generated from a CRT exerts ill effects to human bodies and is thus liable to impair the health of a VDT operator. Further, the CRT structurally requires a large space behind it and hinders the space economization. As a solution of such CRT, there has been known liquid crystal display devices, inclusive of, e.g., a type using twisted nematic (TN) liquid crystal as proposed by M. Schadt and W. Helfrich, Applied Physics Letters, Vol. 18, No. 4 (Feb. 15, 1971), p.p. 127–128.

As a type of liquid crystal device using a TN liquid crystal, a simple matrix-type device has been known as economically inexpensive. This type of device however involves a difficulty of causing crosstalk when driven in a multiplex manner with a matrix electrode structure of a high pixel density, so that the number of pixels has been restricted thereby.

In recent years, in contrast with such a simple matrix-type device, there has been developed an active matrix-type liquid crystal device equipped with a TFT (thin film transistor) at each pixel. This type of device has solved the problem of crosstalk or response speed but is accompanied with a problem that the commercial production of a liquid crystal device free from a defective pixel becomes increasingly difficult as the device area size is larger and, even if it is possible, a tremendous production cost can accrue.

As a type of liquid crystal device having solved such problems of the conventional type of liquid crystal devices, there has been proposed a liquid crystal device of the type which controls transmission of light by utilizing the refractive index anisotropy of ferroelectric liquid crystal molecules in combination with a polarizing device by Clark and Lagerwall (U.S. Pat. No. 4,367,924, etc.). The ferroelectric liquid crystal has generally chiral smectic C phase (SmC*) or H phase (SmH*)in a specific temperature range and, under this state, shows a property of taking either one of a first optically stable state and a second optically stable state responding to an electric field applied thereto and maintaining the resultant state in the absence of an electric field, namely a bistable memory characteristic and also has a quick response speed because it causes an inversion switching based on its spontaneous polarization. Further, the ferroelectric liquid crystal also has an excellent viewing angle characteristic and is therefore Considered as suitable for providing high-speed, high resolution and large area display devices and light valves.

There is also known an anti-ferroelectric liquid crystal as an optical modulation material capable of providing display device similarly based on utilization of the refractive index anisotropy and spontaneous polarization of liquid crystal molecules. The anti-ferroelectric liquid crystal has generally a chiral smectic CA phase (SmCA*) and, in this phase, has an average optically stable molecular axis aligned with a smectic layer normal direction in the absence of an electric field but has an average optically stable molecular axis tilted from the layer normal direction under application of an electric field. Further, the anti-ferroelectric liquid crystal also causes switching based on the coupling between the spontaneous polarization and an applied electric field, so that it shows a very quick response speed and is expected to provide high-speed display devices and light valves.

A problem of a display panel composed by a liquid crystal device using a ferroelectric liquid crystal or anti-ferroelectric liquid crystal is to provide a defect-free alignment state for maintaining a good contrast. In order to form a good liquid crystal alignment state, a device (structure) including a pair of substrates having asymmetrical alignment control layer, i.e., alignment control layers of different materials or different alignment characteristics, has been proposed, e.g., by Japanese Laid-Open Patent Application (JP-A) 61-20930. For example, one of the substrates is provided with a uniaxial alignment characteristic and the other is provided with a non-uniaxial alignment characteristic, whereby the liquid crystal can be aligned at a high controlling order from the side of the substrate provided with the uniaxial alignment characteristic to facilitate the formation of a good liquid crystal alignment state.

On the other hand, in the case where a pair of liquid crystal boundaries are provided with different alignment characteristics, the alignment state may be apparently good but the switching characteristics are liable to be asymmetrical and the good bistability of a ferroelectric liquid crystal can be impaired to result in inferior switching memory characteristic.

In order to solve the problem, JP-A 62-235928 and JP-A 63-228130 have proposed to control the polarities of the surface of a pair of substrates, but a further improvement maybe necessary in order to stabilize the overall behavior of the liquid crystal. Particularly, it may be required to provide a liquid crystal device which has a simple structure and can be produced at a low cost.

Particularly, the symmetricity of switching characteristic is also important to provide a broader drive margin. The symmetrical switching characteristic has to be retained even on continuation of drive for a long period.

Further, in a display panel comprising a liquid crystal device using a ferroelectric liquid crystal or an anti-ferroelectric liquid crystal, a reverse electric field induced by a spontaneous polarization of the liquid crystal per se has been another important problem to be considered, particularly in order to effect a halftone display. More specifically, a desired halftone can be made instable due to an electric field caused by internal ions localized corresponding to the spontaneous polarization, and a hysteresis in optical response can occur in response to an externally applied electric field. More specifically, corresponding to the direction of spontaneous polarization of liquid crystal molecules in the "black" state or the "white" state, respectively, ions are localized in directions so as to stabilize the respective states and, due to a difference in polarity of localization, the application of an identical voltage Vw after a short period of resetting (into "black") can exert actually different voltages applied to the liquid crystal depending on whether the previous state is "white" or "black" state.

As an extremely inadequate phenomenon caused by the above-mentioned reverse electric field, a switching failure may be caused such that, e.g., when a pixel is reset into a black state and then intended to be written into a white state, the written "white" state is not latched by application of a prescribed voltage level but can be returned into a "black" state. This is a fatal defect even in a display panel not requiring a halftone level at each pixel.

As a countermeasure to the above-mentioned reverse electric field, JP-A 63-121020, for example, has proposed to provide a ferroelectric liquid crystal device with an alignment control film of a low impedance in order to cope with a switching failure due to the reverse electric field. Further, JP-A 2-153321 has disclosed low-impedance alignment control film comprising various species of organic conductive films. Further, JP-A 64-49023has proposed to form a thin alignment control film on a passivation film for short circuit prevention which has been made a low impedance. However, it is a present state that these proposals have not provided a sufficient solution.

In this way, the electrooptical characteristics of the liquid crystal device using a chiral smectic liquid crystal has left rooms for further improvement with respect to control of an alignment state, a reverse electric field caused by a spontaneous polarization, and a change in threshold characteristic and an optical response instability depending on a preceding standing state.

SUMMARY OF THE INVENTION

In view of the above-mentioned circumstances, an object of the present invention is to provide an asymmetrically aligning treated liquid crystal device which may be produced at a low cost and is provided with good switching characteristic and alignment characteristic resistant to long hours of drive.

A more specific object of the present invention is to provide a liquid crystal device with stable optical response characteristic inclusive of a good liquid crystal alignment state, a reduced asymmetry of switching and an ensured stability of two states of a liquid crystal (particularly, a ferroelectric liquid crystal or an anti-ferroelectric liquid crystal).

A further object of the present invention is to provide a liquid crystal device allowing excellent halftone display, particularly by preventing an adverse influence of a reverse electric field caused by a spontaneous polarization of a liquid crystal per se in case of a halftone display using a ferroelectric liquid crystal or anti-ferroelectric liquid crystal.

According to the present invention, there is provided a liquid crystal device, comprising a pair of oppositely disposed substrates including a first substrate having a uniaxial alignment characteristic and a second substrate having a non-uniaxial alignment characteristic and a liquid crystal disposed between the first and second substrates, wherein said first and second substrates have surface potentials providing a difference therebetween of less than 50 mV in terms of an absolute value at their liquid crystal-contacting surfaces.

According to another aspect of the present invention, there is provided a liquid crystal device, comprising a pair of oppositely disposed substrates including a first substrate having a uniaxial alignment characteristic and a second substrate having a non-uniaxial alignment characteristic and a liquid crystal disposed between the first and second substrates, wherein at least the second substrate having a non-uniaxial alignment characteristic is provided with a film having a volume resistivity of $10^4$–$10^8$ ohm.cm.

According to a further aspect of the present invention, there is provided a liquid crystal device, comprising a pair of oppositely disposed substrates including a first substrate having a uniaxial alignment characteristic and a second substrate having a non-uniaxial alignment characteristic and a liquid crystal disposed between the first and second substrates, wherein said first and second substrates have surface potentials of an identical polarity at their liquid crystal contacting surfaces.

According to a still further aspect of the present invention, there is provided a liquid crystal device, comprising a pair of oppositely disposed substrates including a first substrate having a uniaxial alignment characteristic and a second substrate having a non-uniaxial alignment characteristic and a liquid crystal disposed between the first and second substrates, wherein said second substrate having anon-uniaxial alignment characteristic is provided with a film having a volume resistivity in the range of $10^4$–$10^8$ ohm.cm.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 14 is a graph showing a hysteresis and switching asymmetricity in V (voltage)-T (transmittance) curve of a liquid crystal device in an Experimental Example appearing hereinafter.

DESCRIPTION OF THE PREFERRED EMBODIMENTS

Figure 1:
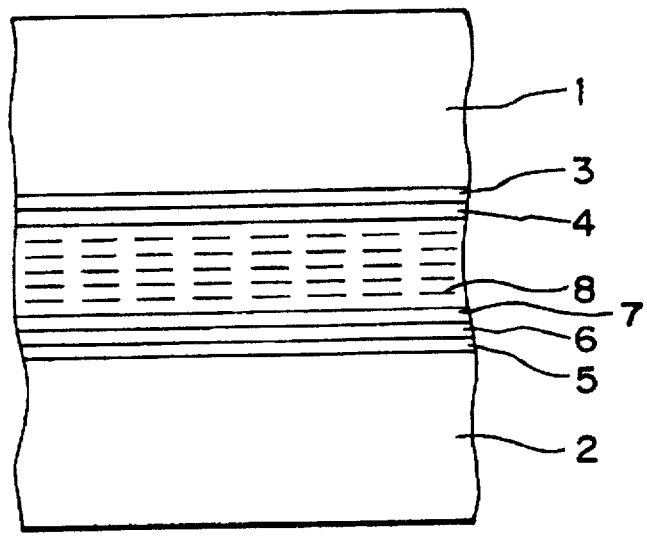
FIG. 1 is a sectional view of an embodiment of the liquid crystal device according to the invention.

According to the present invention, in a liquid crystal device using a liquid crystal showing a chiral smectic phase, particularly a ferroelectric liquid crystal or an antiferroelectric liquid crystal, and provided with an asymmetry, i.e., including a combination of a first substrate having a uniaxial alignment characteristic and a second substrate having a non-uniaxial alignment characteristic, the direction of spontaneous polarization of liquid crystal molecules at the respective boundary surfaces (so-called "outward characteristic or "inward characteristic") may be adjusted to ensure a symmetry of switching characteristic and stably equalize the switching bistable potentials.

As a result, in the above-described device, it becomes possible to suppress the occurrence of alignment defects or defects caused at structurally foreign parts, such as spacers or stepwise difference, e.g., those between pixels, while realizing good memory characteristic and margin characteristic.

Herein, the term "uniaxial alignment characteristic" means a uniaxial homogenous alignment characteristic of a substrate, i.e., the property of a substrate or an alignment film formed thereon of aligning liquid crystal molecules in contact therewith in one direction parallel to its planar extension while having the possibility of some pretilt of the liquid crystal molecules with respect to the substrate surface. On the other hand, the non-uniaxial alignment characteristic is a property of a substrate, i.e., the property of a substrate or a film formed thereon of providing liquid crystal molecules in contact therewith with an alignment state other than the uniaxial homogeneous alignment state, inclusive of a homeotropic alignment state and a random alignment state.

In the liquid crystal device according to the present invention, it is preferred to first establish an identical polarity of surface potentials on both substrates and then set the surface potential values on both substrates to satisfy the above-mentioned prescribed relationship, i.e., a surface potential difference of at most 100 mV, more preferably at most 50 mV, in terms of an absolute value (i.e., within the range of ±100 mV, preferably ±50 mV). The surface potential difference may preferably be at most 30 mV. It is further preferred that the surface potentials on both substrates are substantially identical to each other, so as to stably retain a better symmetrical switching characteristic.

More specifically, in the liquid crystal device according to the present invention, one substrate is provided with a layer (alignment control layer) having a uniaxial alignment characteristic, as defined above, inherently or as a result of an appropriate treatment applied thereto, and the other substrate is provided with a non-uniaxial alignment layer (i.e., a layer not having a uniaxial alignment characteristic). A liquid crystal is disposed between these substrates. Further, by optimally selecting the materials and forming conditions of these alignment control layer, non-uniaxial alignment layer and other members on the substrates, such as transparent electrodes, a short circuit-prevention film and other functional films, the surface potentials on both substrates are controlled as described above.

FIG. 1 is a schematic sectional view of an embodiment of the liquid crystal device according to the present invention. Referring to FIG. 1, a liquid crystal device (cell) includes a pair of substrates 1 and 2, and a liquid crystal 8 disposed between the substrates. One substrate 1 is provided with, on its inner surface contacting the liquid crystal, electrodes 3 and an alignment control layer 4 so as to provide a surface having a uniaxial alignment characteristic of aligning liquid crystal molecules in one direction substantially parallel thereto. The other substrate 2 is provided with electrodes 5 and a film (preferably, a coating film) 6, e.g., one comprising a matrix of an oxide or a polymer and ultrafine particles of an oxide or metal dispersed therein. As desired, the film 6 may be further coated with an additional film 7 of, e.g., a known silane coupling agent. As a result, the substrate surface is provided with a non-uniaxial alignment characteristic.

The film 6 may preferably have a thickness of 300–5000 Å. Materials of the film 6 may preferably be selected so as to adjust the polarity of the surface potential, the resistivity and the surface characteristic of the substrate on which the film 6 is formed. For example, the film 6 may preferably be formed as a film containing various metal or metal oxide. Further, in order to obviate an adverse influence of a reverse electric field inherent to a chiral smectic liquid crystal having a high Ps (spontaneous polarization), the film 6 may preferably have a volume resistivity of $10^4$–$10^8$ ohm.cm, more preferably $10^4$–$10^7$ ohm.cm, as measured in the direction of its layer extension as will be described hereinafter.

The electrodes 3 and 5 may preferably comprise a transparent conductor, such as tin oxide, indium oxide or ITO (indium tin oxide). However, when light transmissivity is not required, the electrode 3 or 5 can comprise a metal such as Cr, Al or Ta.

The alignment control layer 4 may suitably comprise a uniaxially aligning-treated film of an organic material, such as polyimide, nylon or polyvinyl alcohol, or an electroconductive polymer, such as polyanyline or polypyrrole. Particularly, it is preferred to use a film of a known material as described above subjected to a uniaxial aligning treatment by rubbing. Alternatively, the alignment control layer 4 may also comprise a film of an inorganic material such as a silicon oxide film formed by oblique vapor deposition. In this case, the uniaxial aligning characteristic can be provided by appropriately controlling the oblique vapor deposition conditions even without effecting the above-mentioned rubbing operation.

On the other hand, the optionally provided film 7 having a non-uniaxial alignment characteristic can comprise a vapor-deposited film of a vaporizable silane coupling agent or vapor-deposited or coating film of amorphous inorganic material in addition to the above-described coating film of a silane coupling agent. The film 7 may preferably be formed in a thickness of at most 50 Å.

The film 7 may be provided, if necessary, as described above, or the film 6 per se can provide a surface having a non-uniaxial alignment characteristic. Further, instead of uniformly coating the film 6, the optional film 7 may preferably coat the film 7 so as to frequently expose the film 6 at a large number of points.

The liquid crystal layer 8 may preferably comprise a chiral smectic liquid crystal (i.e., a liquid crystal assuming a chiral smectic phase), particularly one showing a spontaneous polarization inclusive of a ferroelectric liquid crystal and an anti-ferroelectric liquid crystal so as to enjoy advantageous effects accompanying the device structural characteristic of the present invention. It is, however, also possible to use another liquid crystal material, such as a nematic liquid crystal.

In the case of using a chiral smectic liquid crystal, particularly a ferroelectric liquid crystal or an anti-ferroelectric liquid crystal, in the device structure according to the present invention, it is particularly effective to use a liquid crystal material showing a phase transition series on temperature decrease of Iso. (isotropic phase)→SmA (smectic A phase)→SmC* (chiral smectic phase)→Cryst. (crystal phase) in view of its alignment characteristic.

In order to provide a liquid crystal device exhibiting an improved display brightness, it is preferred to use a chiral smectic liquid crystal material providing a bookshelf structure in which smectic liquid crystal molecular layers in SmC* phase stand perpendicularly or with a slight inclination from a normal to the substrates. Examples of such a chiral smectic liquid crystal material may include a composition containing a fluorine-containing mesomorphic compound having a central core to which a fluorocarbon terminal portion and a hydrocarbon terminal portion are connected, and showing a smectic phase or a latent smectic phase. Examples of such fluorine-containing compounds may include those, disclosed in U.S. Pat. Nos. 5 082 587 and 5,262,082 PCT International Publication PCT WO93/22936, etc.

More specifically, it is preferred to use a liquid crystal material containing such a fluorine-containing compound appropriately selected and showing the above-mentioned phase transition series of Iso.→SmC→SmC*→Cryst., i.e., not showing Ch. (cholesteric phase),on temperature decrease.

The above-mentioned device according to the present invention basically has an asymmetric structure wherein only one substrate surface has a uniaxial alignment characteristic (has been uniaxially aligning-treated), and wherein a liquid crystal (particularly a ferroelectric liquid crystal or an anti-ferroelectric liquid crystal) is aligned particularly in its SmA temperature region as a uniaxial molecular growth propagating from the surface of the substrate having a uniaxial alignment characteristic, thereby providing a good alignment state in the SmC* phase.

Particularly, in the case of using the above-mentioned chiral smectic liquid crystal showing no cholesteric phase, the asymmetrical device structure according to the invention is preferred so as to effect a good alignment control at the time of Iso→SmA phase transition on temperature decrease, thereby realizing a uniform alignment state.

Hereinbelow, some detailed description will be made regarding the surface potential and its measurement method and the function attributable to the surface potential characteristic defined and utilized in the present invention.

The surface potential defined herein is a composite-potential induced at a film surface caused by a potential due to a polarity of a surface-forming film per se, an electrical double layer potential due to a carrier migration with a lower layer film, a potential due to ionic molecules contained in the film, etc., and may be measured according to the following method.

Regarding the measurement of such a surface potential as described above, reports have been made on polyimide film as a generally known liquid crystal-alignment film by Ito and Iwamoto (Tokyo Institute of Technology), Journal of Electrostatics, 17, 5, pp. 352–358 (1993); Journal of Electrostatics, 33, pp. 147–158 (1994), etc.. Based on phenomena that the surface potential of a polyimide film is remarkably varied depending on the kinds of lower metal films, the direction and magnitude of the variation are related with the work functions of the metal films, and the surface potential varies depending on the polyimide film thickness and is saturated around 5 nm which may be the tunneling limit of carriers, Ito et al have concluded that the surface potential is principally caused by an electrical double layer due to carrier movement between the film and the electrode.

As apparatus for surface potential measurement, there have been known a vibration capacitance type and a sector-type according to the capacitance type, and a pyroelectricity type according to the resistance type. The surface potential values referred to herein are based on values measured by using a vibration capacitance-type surface potential meter ("Model 320B", available from Trek Corp.). More specifically, various liquid crystal contacting films of a uniaxial alignment characteristic were respectively formed on a lower layer structure actually adopted in an actual cell structure including a transparent electrode film and a lower layer of a short circuit prevention film, etc., thereon and the surface potential of the respective films were measured. As a result, the measured values of surface potential remarkably varied in the range of roughly 500 to −500 mV depending on the materials of the film per se and the lower layer.

Moreover, according to our experiments, the measured values of surface potential remarkably vary depending on polar molecules adsorbed on depending on the surface. Particularly, a film material having a high hygroscopicity can provide remarkably different measured values between a vacuum environment and the atmospheric environment. Regarding a liquid crystal-contacting surface in a liquid crystal device, the liquid crystal injection into the liquid crystal device is frequently performed under heating in a vacuum environment. Accordingly, in some cases, after water molecules adsorbed on a surface is liberated by evaporation and then some molecules in the liquid crystal material can be adsorbed and fixed on the surface to develop a new surface potential. Accordingly, the measurement of surface potential should preferably be performed in an environment equivalent to a liquid crystal-injection environment for a particular device concerned.

Figure 2:
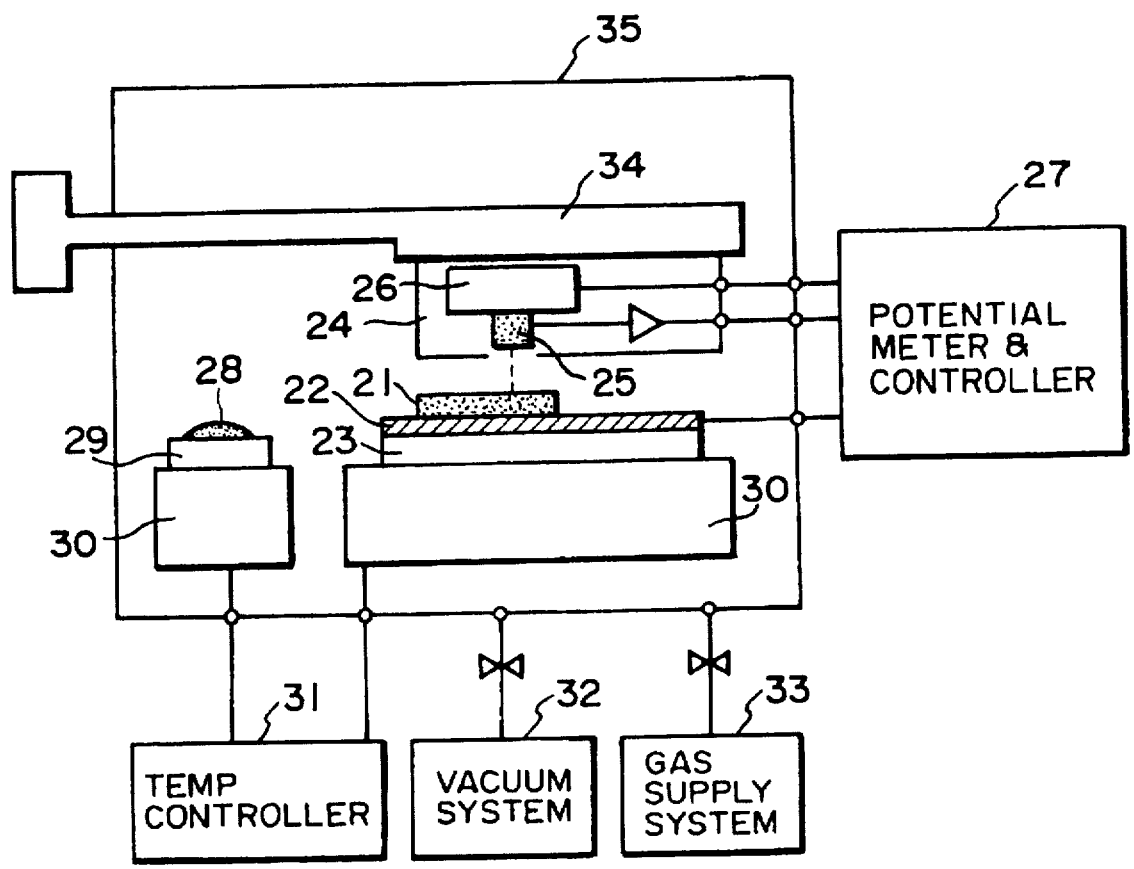
FIG. 2 is a schematic illustration of a surface potential measurement system adopted in defining the invention.

FIG. 2 is a schematic illustration of an apparatus suitably used for measurement of surface potential adopted in the present invention (i.e., based on the above-mentioned vibration capacitance-type surface potential meter ("Model 320B", Trek Corp.). Referring to FIG. 2, the measurement is performed in a vacuum chamber 35 connected to a vacuum exhaust system 32 and a gas supply system 33 for supplying dry nitrogen, etc. A sample film 21 for surface potential measurement is formed on a lower structure, which is basically identical to that contained in a device actually contemplated, including an identical substrate 23 and an identical electrode 22 (and an identical lower layer, if any) and under identical conditions as in the device, the substrate 23 carrying the sample 21 is disposed on a heating bed 30 of which the temperature is controlled by a temperature controller 31 placed outside the vacuum chamber 35.

A surface potential measurement probe 24 is composed of a sensor electrode 25, a preamplifier and a vibrating element 26 for vibrating the electrode 22 to modulate the capacitance between the sample film 21 and the electrode 23, and is connected to a surface potential measurement and control apparatus 27 disposed outside the vacuum chamber 35.

Specific-surface potential measurement conditions to be adopted may correspond to standard liquid crystal injection conditions. For example, measurement may be performed after heating a sample at a temperature of 80°–100° C. for 15 min. to 2 hours under a reduced pressure of $10^{-1}$ to $10^{-3}$ torr. and cooling to room temperature. First, the gap between the surface of the electrode 22 and the sensor electrode 25 is held at an appropriate value around 0.5–5 mm by a biaxial displacement apparatus 34 to measure a surface potential at an exposed part of the electrode 22 adjacent to the sample film 21. Then, the sensor electrode 25 is moved to above the sample film 21 by the biaxial displacement apparatus 34 to measure a surface potential thereat. The surface potential of the sample film is determined by subtracting the measured surface potential at the exposed electrode part as the reference potential from the directly measured surface potential at the sample surface.

In some cases, a surface potential in the state where liquid crystal molecules are adsorbed on the surface through the liquid crystal injection step is considered to govern an internal potential applied between the substrates. Accordingly, in actual cases, it is preferred to perform repetitive experiments under comparative conditions and adopt a measured value obtained under a condition giving a better correlation. For this purpose, a liquid crystal 28 may be placed in a vessel 29 for heating evaporation disposed on a heating table 30 so as to allow the evaporation of the liquid crystal 28 to form a liquid crystal vapor-containing atmosphere and cause the liquid crystal to be adsorbed by the surface of the sample film 21 according to necessity.

Figure 3:
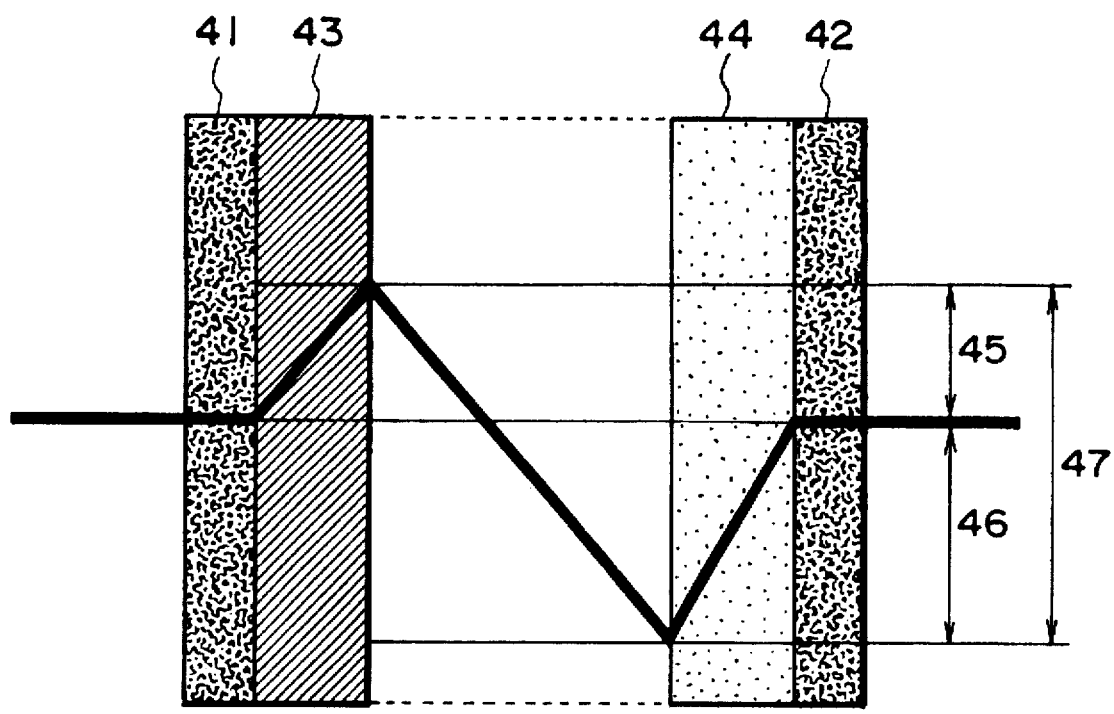
FIG. 3 is a schematic illustration for explaining a concept of internal potential in a liquid crystal device of the invention.

Now, the concept of an internal potential or voltage caused by a difference between surface potentials on oppositely disposed liquid crystal-contacting boundaries of two substrates in a liquid crystal device having an asymmetrical structure of the present invention, will be described with reference to FIG. 3. Referring to FIG. 3, substrates (electrode plates) 41 and 42 are provided with a uniaxial alignment control layer (layer having a uniaxial alignment characteristic) 43 and a non-uniaxial alignment control layer (layer having a non-uniaxial alignment characteristic) 44, respectively, of mutually different materials. These electrode plates are disposed opposite to each other with a prescribed gap therebetween to form a cell. When a blank cell (i.e., a cell containing no liquid crystal therein) is constituted while short circuiting between the electrode plates 41 and 42, a surface potential 45 and a surface potential 46 may be formed on the layers 43 and 44, respectively, thereby forming an internal voltage 47 therebetween.

In view of the above-mentioned measured surface potential values, the internal voltage occurring corresponding to the surface potential difference can amount to ±1 volt at the maximum. The presence of such an internal voltage due to a surface potential difference is considered to be effectively equal to the continual application of a DC offset voltage between a pair of opposite electrodes. An influence of the internal voltage due to a surface potential difference on a switching threshold was experimentally confirmed as follows. A cell of a symmetrical structure including a pair of substrates having thereon alignment control films of identical materials and subjected to identical treatments (i.e., having a surface potential difference of 0) was prepared and supplied with a DC offset voltage in superposition between the opposite electrodes to evaluate the change in switching threshold, whereby a change in-switching threshold was confirmed to occur at a DC offset voltage level of ±50 mV to one hundred and several tens mV.

Then, based on surface potential values measured with respect to various alignment control films, various alignment control films were combined to form liquid crystal cells of asymmetrical structures as described above to compare surface potential differences and asymmetry of switching threshold, whereby it has been observed that the polarity of surface potential difference substantially coincides with the direction of asymmetrical switching threshold characteristic, and a significant correlation is observed between the absolute value of surface potential difference and the degree of asymmetrical switching threshold characteristic. More specifically, in devices wherein surface potential differences are small, particularly smaller than 50 mV, substantially no asymmetrical switching characteristic appeared in many cases regardless of surface potential polarities on both substrates. Further, in the case where the surface potential polarities are identical on both substrates and the surface potential difference is within ±100 mV, there was a tendency that substantially no switching asymmetry. In these cases, the switching threshold difference as a measure of a switching asymmetry can be suppressed to a low level of within ±1.0 volt. On the other hand, devices having larger surface potential differences of ±100 mV to ±200 mV tended to show an asymmetrical characteristic affecting the drive margin. Further, devices having surface potential differences exceeding ±250 mV caused switching failure and showed a loss of bistable potential characteristics in many cases.

As described above, according to the present invention, it has been experimentally confirmed that an asymmetrical switching threshold characteristic in an asymmetrically structured cell having asymmetrical alignment control films is principally controlled by surface potentials on the alignment control films and the asymmetrical switching threshold characteristic can be suppressed by controlling the surface potentials on the liquid crystal-contacting surfaces of both substrates even in an asymmetrically structured cell.

Figure 4A:
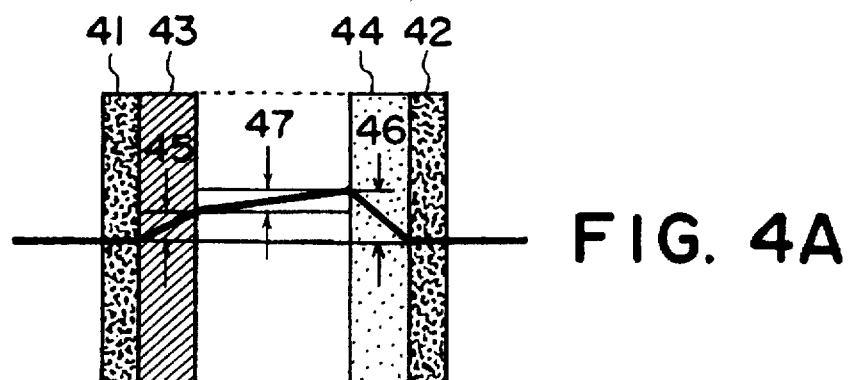
FIGS. 4A–4D are respectively an internal potential state in a liquid crystal device of the invention.
Figure 4B:
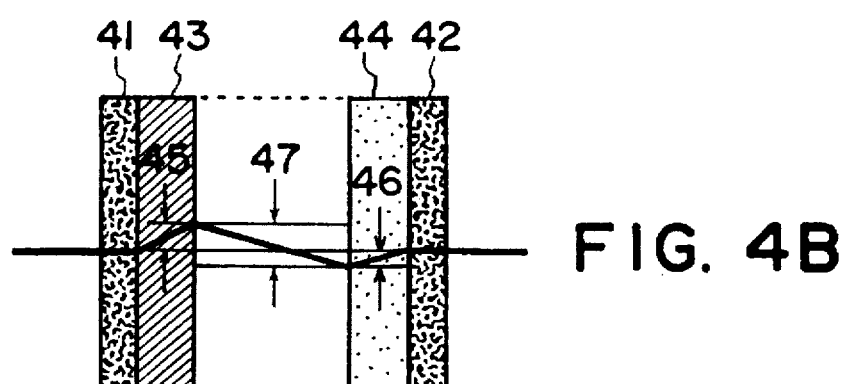
Figure 4C:
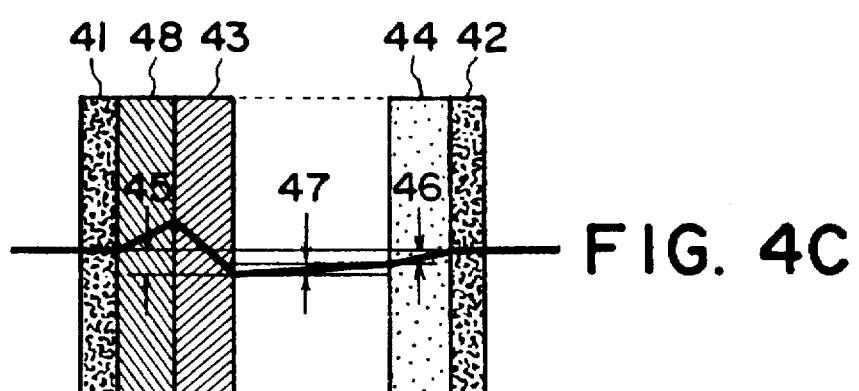
Figure 4D:
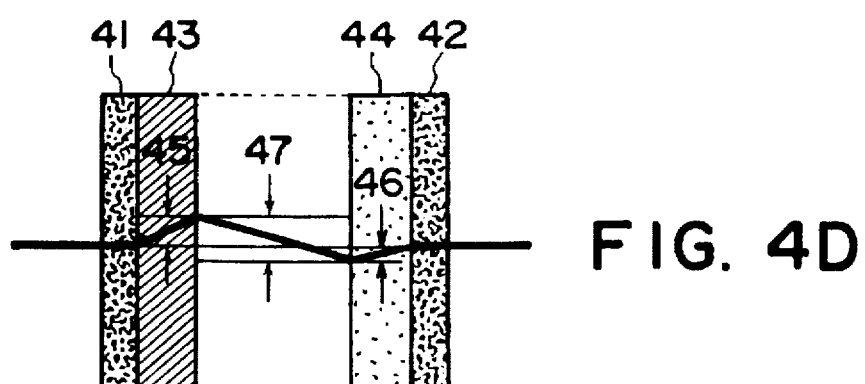

Several particularly preferred embodiments of the present invention will be described with reference to FIGS. 4A–4D illustrating various potential characteristics across various cells (devices). FIG. 4A shows a device wherein electrode plates 41 and 42 are provided with a uniaxial alignment control layer 43 and a non-uniaxial alignment control layer 44 of different materials whereby surface potentials 45 and 46 of the same polarity occur to provide a internal voltage 47 of below 50 mV. FIG. 4B shows a device having surface potentials 45 and 46 of different polarities giving an internal voltage 47 of below 50 mV. FIG. 4C shows a device obtained by disposing an additional film 48, such as a short-circuit prevention film, between the electrode plate 41 and the alignment control layer 43 on one substrate, thereby providing the alignment control layer 43 with a surface potential which is different from the one in FIG. 4B and provides an internal voltage 47 of below 50 mV. FIG. 4D shows a device providing the layers 43 and 44 with surface potentials 45 an 46, of which the absolute values are respectively below 50 mW.

As described above, in the liquid crystal device according to the present invention, it is important to retain an appropriate relationship regarding surface property between the surfaces having a uniaxial alignment characteristic and a non-uniaxial alignment characteristic on both substrates in order to provide equal bistable potential characteristics for switching of a ferroelectric liquid crystal or an antiferroelectric liquid crystal after alignment.

Further, in the case of a chiral smectic liquid crystal inclusive of a ferroelectric liquid crystal and an antiferroelectric liquid crystal, particularly in the case of a ferroelectric liquid crystal, it is also important to pay attention to the direction of spontaneous polarization, i.e., whether the spontaneous polarization is directed toward a substrate (outward characteristic) or directed toward the bulk of the liquid crystal (the center of the liquid crystal layer) (inward characteristic), at the time of SmA→SmC* transition, as a characteristic of the liquid crystal-contacting surfaces of the substrate having a uniaxial alignment characteristic and the substrate having a non-uniaxial alignment characteristic. The direction has been recognized to have a strong correlation with the surface potential polarity on the liquid crystal-contacting surface of each substrate.

The surface potential polarity is considered to be caused by a surface potential generated by contact charging between an organic or inorganic film and a metal and distribution of charge particles such as ions in the film.

A substrate (electrode plate) in the liquid crystal device according to the present invention may be formed by laminating the above-mentioned alignment film, coating film or vapor deposition film so as to cover transparent electrodes of, e.g., ITO, formed on a base plate. In this instance, the dipole of a chiral smectic liquid crystal inclusive of a ferroelectric liquid crystal and an anti-ferroelectric liquid crystal and accordingly the switching characteristic of the liquid crystal are inevitably affected by the polarity and magnitude of surface potential on both substrates having a uniaxial alignment characteristic and a non-uniaxial alignment characteristic. According to a preferred embodiment of the present invention, the surface potential polarities on both substrates are properly controlled, preferably made identical to each other, to improve the alignment state and switching characteristic of the liquid crystal.

In the liquid crystal device according to the present invention, in addition to controlling the surface potential difference and the surface potential polarities between both substrates as described above, it is preferred to suppress the absolute value of surface potential on each substrate to a smaller value, particularly at most 100 mV, preferably at most 50 mV, in order to suppress the influence of a substrate surface on dipoles of liquid crystal molecules and prevent the transition into a monostable characteristic with time.

As described above, in order to provide good alignment state and equal switching potentials in the liquid crystal device according to the present invention, it is important to appropriately select the surface materials on both substrates. In this regard, it has been recognized important to pay attention to a surface tension factor as determined particularly by a dispersion term of a surface energy as a latching potential factor in addition to the polarity factor on the liquid crystal-contacting surfaces of both substrates.

The substrate having a non-uniaxial alignment characteristic in the liquid crystal device of the present invention may preferably have a dispersion term of surface energy which is sufficiently small to be at a level identical to the surface energy at a temperature in the neighborhood of the SmA→SmC* transition temperature of the liquid crystal used, providing a difference therefrom of at most 5 dyne/cm. In other words, the dispersion term may preferably be at most 30 dyne/cm. Alternatively, the dispersion term may preferably be larger than the surface energy of the substrate having a uniaxial alignment characteristic or a value of at least 40 dyne/cm. The above ranges are preferred because good switching characteristic is attained thereby in many cases.

The above-mentioned ranges of the surface energy (as represented by the dispersion term) are preferred for the following reasons. In the above-mentioned case of a low surface energy (of preferably at most 30 dyne/cm), the liquid crystal shows a so-called homeotropically wetting state against the non-uniaxially aligning surface, whereby the liquid crystal in the vicinity of the surface is almost fixed and the switching potential is generally governed by the inner side (bulk liquid crystal side). On the other hand, in the case of a large surface energy (of preferably at least 40 dynes/cm), the liquid crystal in the vicinity of the surface is fixed by a so-called homogeneously wet state, so that the switching potential may be also governed by the inner side (bulk liquid crystal side).

The surface properties of the substrate having a non-uniaxial alignment characteristic can be adjusted by appropriate selection of the surface material and shape.

On the other hand, the substrate having a uniaxial alignment characteristic may preferably have a dispersion term of surface energy of at least 40 dyne/cm, more preferably at least 42 dyne/cm, so as to provide good uniaxial homogeneous alignment characteristic and a stable switching potential, through appropriate selection of materials of the alignment control film.

Next, the measurement of surface energy on the respective substrates in a macroscopic surface state will be described.

Reagents for providing a liquid droplet for contact angle measurement may include for example, A: α-bromonaphthalene, B: methylene iodide, C: water, etc. After the measurement of contact angles with liquids A, B and C, it is possible to use calculation formulae described, e.g., in Nippon Settyaku Kyokai-shi (Journal of Japan Adhesive Society), Vol. 8, No. 3 (1972) page 131 -, Kitasaki et al, "Expansion of Fowkes Formula and Evaluation of Surface Tension on Polymer Solid" to calculate the surface energy while noting the dispersion term thereof. On the other hand, as described above, a surface energy may include a polarization term and a hydrogen bond term in addition to the dispersion term. These terms are however closely related with the surface polarity of a film, and a good correlation with the above-mentioned characteristics may preferably be evaluated by noting only the value of the dispersion term.

In the liquid crystal device having the structure shown in FIG. 1, the film 6 contained in the substrate having a non-uniaxial alignment characteristic is effective for adjusting the polarity or surface state (surface energy), and further the volume resistivity measured on the surface of the substrate. The adjustment may be facilitated by appropriate selection of components based on their properties.

It is possible to use a film 6 comprising specific materials so as to more appropriately control the surface potential. Examples thereof may include films, preferably coating-type films, comprising a matrix of $SiO_x$, $TiO_x$, $ZrO_x$, another meltable inorganic oxide, silica and a polymer, such as siloxane polymer, and ultrafine particles dispersed therein of oxides, inclusive of group II element oxides, such as ZnO, CdO and $ZnCdO_x$; and group IV element oxides, such as $GeO_2$, $SnO_2$, $GeSnO_x$, $TiO_2$, $ZrO_2$ and $TiZrO_x$; and metals, such as Pd so as to control the film property and the resistivity of the film.

The above-mentioned oxide can contain electroconductivity-controlling impurities added thereto. Such electroconductivity-controlling impurities may include: n-type impurities (donor: impurities enhancing electron-conductivity) comprising group III elements, such as B, Al, Ga and In, and p-type impurities (acceptors: impurities enhancing hole-conductivity) comprising group I elements, such as Cu, Ag, Au and Li, respectively, for the group II element oxides; and n-type impurities comprising group V elements, such as P, As, Sb and Bi, and p-type impurities comprising group III elements, such as B, Al, Ga and In, respectively, for the group IV element oxides. In case where the film 6 is used, it is possible to apply an additional film 7 of, e.g., a silane coupling agent, so as to effect a fine control of the surface state, according to necessity, as mentioned hereinbefore.

The effects of using such ultrafine particles having a particle size of 30–300 Å, preferably 30–150 Å, will be described below.

First, when a relatively thick film (having a thickness of 300–5000 Å, preferably 1000–5000 Å) containing the ultrafine particles is formed, a plurality of the ultrafine particles can be stacked in the film. As the above-mentioned ultrafine particles generally have a high hardness, the stack structure can exhibit a strong pressure resistance which is effective for preventing short circuit between the substrates liable to be caused by contamination of the foreign matter within the liquid crystal cell. This was corroborated by a specific test wherein a 1400 Å-thick film of silica containing antimony-doped $SnO_x$ dispersed therein showed a withstand voltage of 25 volts by an ordinary probe test performed by us.

The film containing the ultrafine particles has been provided with a moderately lowered resistivity, so that an excessive charge accumulation can be avoided. This also contributes to an increase in withstand voltage.

Further, the film containing the ultrafine particles can be formed in a relatively large thickness. Accordingly, when a lower layer structure includes a stepwise height difference, e.g., due to formation of color filter segments, switching elements, such as thin film transistors (TFT), and metal electrodes for conductivity enhancement, the stepwise height difference can be absorbed by the film, to suppress an ill effect thereby against alignment control function exerted by the opposite substrate having a uniaxial alignment characteristic, and suppress the occurrence of alignment defects during the drive.

Furthermore, the film containing ultrafine particles can increase the latitude of controlling the surface potential through appropriate selection of the film material and thickness, and other factors related with the film.

The film containing ultrafine particles can be provided with a surface having minute projections with an appropriate hardness. As a result, even if various processing is applied thereto on the substrate having a non-uniaxial alignment characteristic, the surface can be free from uniaxial alignment characteristic, thus obviating alignment disorder to provide improved characteristics.

The film 6 can be formed by two or more materials in combination for the matrix and/or the fine particles in order to more accurately adjust various properties inclusive of the surface potential.

Particularly, the appropriate selection and mixing in an appropriate ratio of polymer species for constituting the film 6 may be effective in reducing the surface potential difference between both substrates to at most 100 mV, more preferably to below 50 mV, and providing both substrates with the same polarity of surface potential. As a result, the dipole (Ps) of a ferroelectric liquid crystal or an anti-ferroelectric liquid crystal can better respond to an external electric field.

Further, the film 6 on the substrate having a non-uniaxial alignment characteristic in the liquid crystal device according to the present invention can be formed as a passivation film including laminated plural layers.

The passivation film may preferably be designed to provide a surface potential which is an intermediate value among the surface potentials of constitute single layers, when respectively measured separately on an arbitrarily selected electrode with reference to the electrode potential.

Particularly, if the laminate passivation film on the substrate having a non-uniaxial alignment characteristic is provided with a surface potential which is different from that of the opposite substrate having a uniaxial alignment characteristic by a smaller value, preferably less than 50 mV, or more preferably substantially identical to that of the opposite substrate, a more stable switching characteristic of a chiral smectic liquid crystal can be obtained.

Further, a lower layer (i.e., a layer closer to the base plate) in the laminated passivation film may preferably be composed of a polycrystalline metal oxide film or a polycrystalline semiconductor film optionally doped with an electroconductivity-controlling impurity. In this case, the lower layer in the passivation film may preferably be designed to have a resistivity anisotropy, e.g., a volume resistivity of $10^4$–$10^8$ ohm.cm in the film thickness direction and a volume resistivity of $10^6$–$10^9$ ohm.cm in the film extension direction.

Further, such a lower layer in the laminated passivation film can also be composed of a film, preferably a film formed by wet coating, comprising a matrix of an insulating material or another material and fine particles dispersed therein and optionally doped with an electroconductivity-controlling impurity. In this case, the passivation film may desirably have a volume resistivity of $10^4$–$10^8$ ohm.cm.

These lower layers may preferably have a thickness in the range of 500–2000 Å.

The laminated film can include at least one layer provided with a high withstand voltage for short circuit prevention and another layer having another function, so that the laminated film will satisfy various functions in combination.

Particularly, if the surface potential on the laminated passivation film is controlled to be an intermediate value among the surface potentials given by the respective layers constituting the passivation film, the surface potential on the laminated film can be easily adjusted to the surface potential of the opposite uniaxial alignment control film, so as to ensure the bistability of the liquid crystal.

If a lower layer in the laminated passivation film is composed of a polycrystalline metal oxide film or a polycrystalline semiconductor film optionally doped with an electroconductivity-controlling impurity, it becomes possible to effect fine adjustment of the surface potential to a value of at most 100 mV (absolute value), preferably to below 50 mV. The resistivity of the film can be lowered simultaneously, so that it becomes possible to reduce the resistance×capacitance product which is a factor causing a delay time constant of the device. Further, when the volume resistivity is provided with an anisotropy, more preferably so as to be $10^4$–$10^8$ ohm.cm in the film thickness direction and $10^6$–$10^9$ ohm.cm in the film extension direction, a crosstalk between pixels can be prevented.

In case where a lower layer in the laminated passivation film is formed as a film comprising an insulating material as a matrix and containing ultrafine particles doped with an electroconductivity-imparting impurity, it is possible to effect fine control of the surface potential similarly as above, thus facilitating the realization of a surface potential difference of at most 100 mV. Simultaneously, the resistivity of the film can be lowered, so that it becomes possible to reduce the resistance×capacitance product causing a delay time constant of the device. The adjustment to a volume resistivity in the range of $10^4$–$10^8$ ohm.cm is appropriate for this purpose.

Incidentally, in the present invention, the polycrystalline metallic oxide constituting a layer in the laminated film on the substrate having a non-uniaxial alignment characteristic may for example comprise a group II element oxide, such as ZnO, CdO, or ZnCdOx; or a group IV element oxide, such as $GeO_2$, $SnO_2$, GeSnOx, $TiO_2$, $ZrO_2$ or TiZrOx; and the polycrystalline semiconductor material may for example comprise a group IV semiconductor, such as Si or SiC. On the other hand, examples of the electroconductivity-controlling impurities may include: n-type impurities (donor: impurities enhancing electron-conductivity) comprising group III elements, such as B, Al, Ga and In, and p-type impurities (acceptors: impurities enhancing hole-conductivity) comprising group I elements, such as Cu, Ag, Au and Li, respectively, for the group II element oxides; and n-type impurities comprising group V elements, such as P, As, Sb and Bi, and p-type impurities comprising group III elements, such as B, Al, Ga and In, respectively, for the group IV element oxides or semiconductors.

On the other hand, as materials for constituting the film containing ultrafine particles optionally doped with an electroconductivity-controlling impurity, examples of the matrix material may include SiOx, TiOx, ZrOx, another meltable inorganic oxide, silica and a polymer, such as siloxane polymer, and examples of the ultrafine particles may include oxides, inclusive of group II element oxides, such as ZnO, CdO and ZnCdOx; and group IV element oxides, such as $GeO_2$, $SnO_2$, GeSnOx, $TiO_2$, $ZrO_2$ and TiZrOx. Further, examples of the electroconductivity-controlling impurities may include: n-type impurities (donor: impurities enhancing electron-conductivity) comprising group III elements, such as B, Al, Ga and In, and p-type impurities (acceptors: impurities enhancing hole-conductivity) comprising group I elements, such as Cu, Ag, Au and Li, respectively, for the group II element oxides; and n-type impurities comprising group V elements, such as P, As, Sb and Bi, and p-type impurities comprising group III elements, such as B, Al, Ga and In, respectively, for the group IV element oxides.

As a consideration for adding such an impurity in the passivation film, a donor is added in case where the substrate having a uniaxial alignment characteristic has a positive surface potential, and an acceptor is added in case of a negative surface potential. The concentration of the impurity can vary depending on the kind of the material and the crystal state (density of crystal defect) but may roughly be determined so as to provide a free electron or free hole concentration of ca. $10^{11}$–$10^{14}$/$cm^3$. At this time the surface potential can also be changed simultaneously to a level of 100 mV.

In case of using a polycrystalline material, the impurity may be actually added in an amount of preferably $10^{17}$–$10^{20}$/$cm^3$ (ca. 0.01–1% of the matrix material) while taking the addition efficiency of the impurity into consideration. The surface potential changes by about 50 mV for 1 digit increase of the impurity. The addition of such an electroconductivity controlling impurity can be omitted depending on the prescribed electro-conductivity of at least one layer constituting the passivation film of a multi-layer structure.

On the other hand, in a liquid crystal device having a structure as shown in FIG. 1, the alignment control layer 4 on the substrate 1 having a uniaxial alignment characteristic can be composed of a plurality of polymeric materials, preferably organic polymeric materials, each capable of forming an alignment control film having a uniaxial alignment characteristic, so as to finely control the surface potential values, polarity thereof and alignment control characteristic between the pair of substrates.

Such composite alignment control layer 4 may for example comprise at least two members in mixture selected from organic polymeric materials, such as polyimide, polyvinyl alcohol, polyaniline, polypyrrole and nylon. The thickness may preferably be ca. 30–300 Å.

In order to provide a uniaxial alignment characteristic, the film of the above mixture material may preferably be rubbed.

Figure 5:
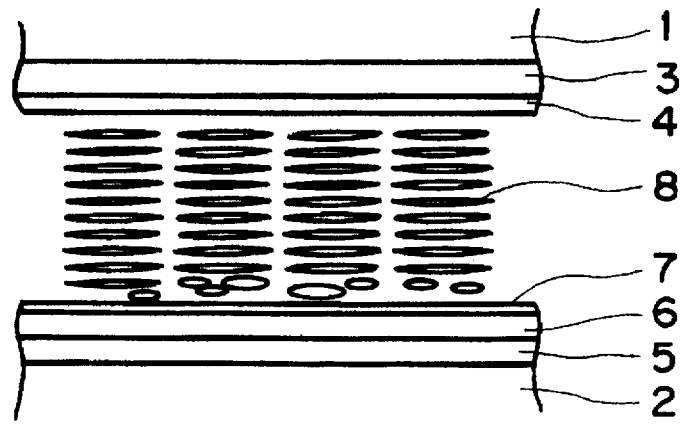
FIG. 5 is a schematic sectional view for illustrating a liquid crystal molecular alignment state in an embodiment of the liquid crystal device according to the invention.

Regarding the liquid crystal alignment state given by the device structure a shown in FIG. 1, it is assumed that a higher-orientation liquid crystal molecular alignment appears in the vicinity of a boundary between the alignment control film 4 having a uniaxial alignment characteristic and the liquid crystal layer 8, and a somewhat disordered or fixed (dull liquid crystal molecular movement) boundary state is formed in the vicinity of a boundary between the substrate having a non-uniaxial alignment characteristic and the liquid crystal layer (boundary between 7 and 8) as shown in FIG. 5.

Herein, switching failure and optical response hysteresis which can be problematic in gradational display may be explained as follows from an electrical aspect.

Figure 6A:
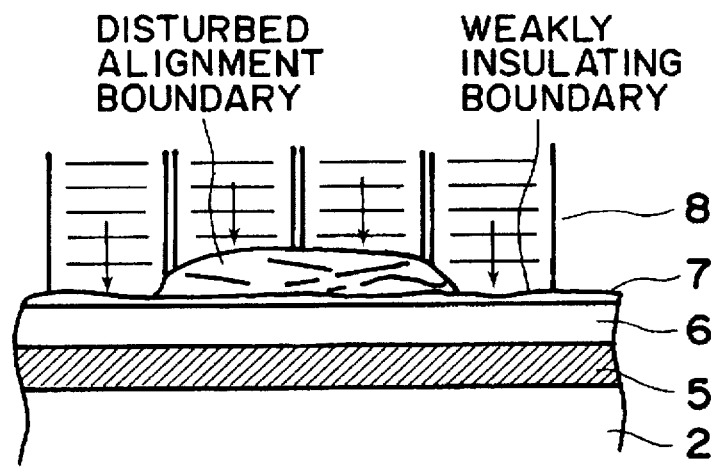
FIGS. 6A and 6B are schematic partial sectional illustrations of explaining a function of a liquid crystal device according to the invention.
Figure 6B:
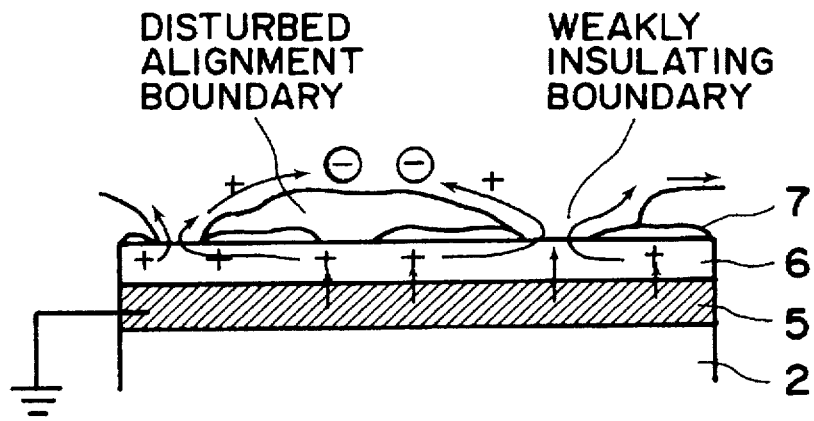
Figures 7, 8:
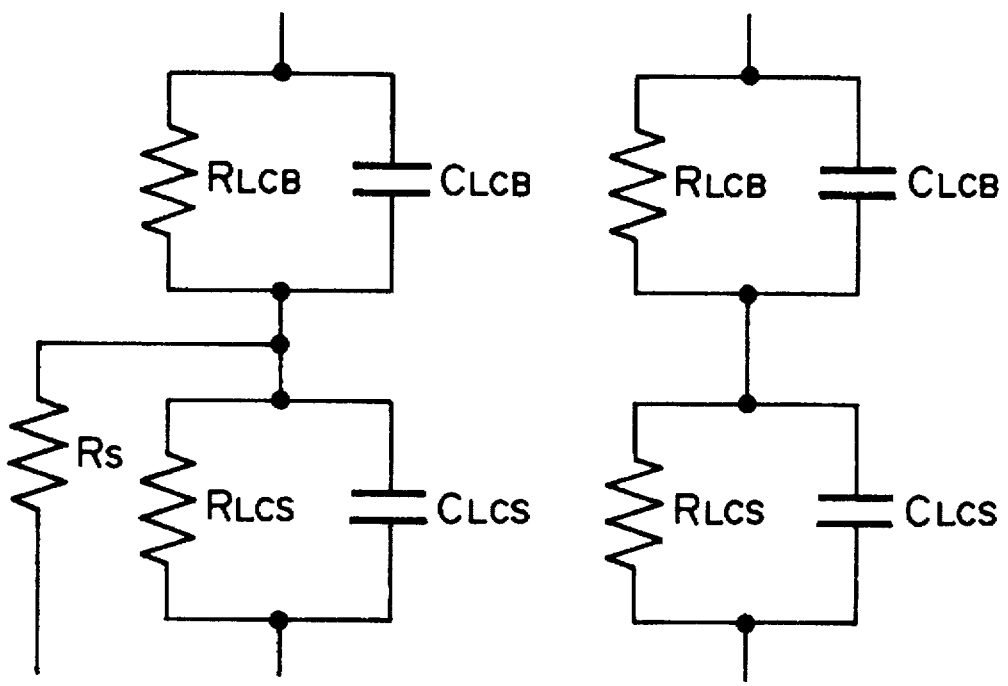
FIG. 7 is an equivalent circuit diagram of a liquid crystal device according to the invention.
FIG. 8 is an equivalent circuit diagram of a conventional liquid crystal device.

FIGS. 6A and 6B are schematic illustrations for explaining the function and effect of the device structure according to the present invention on the liquid crystal molecular alignment state shown in FIG. 5, and FIGS. 7 and 8 are equivalent circuit diagrams of a device structure according to the present invention and a conventional one, respectively, for illustrating a difference therebetween. FIGS. 6A and 6B indicate a boundary portion of liquid crystal molecular alignment disorder and a weakly insulating boundary. In the equivalent circuits shown in FIGS. 7 and 8, $C_{LCB}$ and $R_{LCB}$ represent a capacitance and a resistance, respectively assumed, of a liquid crystal bulk portion, and $C_{LCS}$ and $R_{LCS}$ represent a capacitance and a resistance, respectively assumed, of a portion of the liquid crystal in the vicinity of a boundary as shown in FIGS. 6A and 6B. FIG. 7 also shows a low-resistivity conducting path Rs as a characteristic of the present invention. The "disturbed alignment boundary" shown in FIGS. 5 and 6 can be recognized as a partial impedance or extremely as an almost insulating portion ($R_{LCS}$) in an equivalent circuit as shown in FIG. 8. On the other hand, a center of accumulation of ions or other charged particles assumed to cause an electrical hysteresis depending on whether a previous state is "black" or "white" may be assumed to be in the vicinity of spontaneous polarization (Ps) alignment edge in the liquid crystal bulk side (interior of the liquid crystal layer) from the above-mentioned "disturbed alignment boundary". Accordingly, if the liquid crystal boundary is insulating as in a conventional case (the boundary on the non-uniaxial alignment substrate side being assumed to be simply insulating), $C_{LC}$ (capacitance) and $R_{LC}$ (resistance) at the boundary portion determine an influence of the electrical history of the previous state whereby the hysteresis is not consequently removed to cause switching failure.

In contrast thereto, in the device structure according to the present invention, as shown in FIGS. 6A and 6B, a film, preferably a wet-applied film, 6 on the substrate having a non-uniaxial alignment characteristic is set to have a relatively low resistivity of $10^4$–$10^8$ ohm.cm, the above-mentioned insulating liquid crystal boundary apparently disappears.

This behavior may for example be confirmed by a phenomenon that the real part of a cole-cole plot assumed to represent a liquid crystal portion decreases when a low frequency (1 mHz–10 Hz) side impedance in the device of the present invention provided with such a film 6 is observed.

More specifically, in the present invention, it is assumed possible to remove the electrical history by a flow in a film thickness direction or a sheet extension direction via weakly insulating portions which are assumed to be present at not a few parts on the "disturbed alignment boundary (FIG. 6B)". Alternatively, the film 6 may directly lower the resistivity of the boundary layer. FIG. 7 shows an equivalent circuit of the device insulating such a film 6 represented by a low-resistivity conduction path (Rs). As a result, switching failure may be obviated.

In order to effectively realize the above-mentioned function and effect in the present invention, it is preferred that the low-resistivity film is formed by wet application to have a surface state including a surface unevenness (e.g., as measured by observation through a SEM (scanning electron microscope) of at least 200 Å. In order to provide such an unevenness uniformly, it is preferred to form a coating film of a matrix (binder) containing electroconductive particles of 30–300 Å in particle size by wet application.

The above-mentioned unevenness range of the coating film is based on a knowledge that an approximate estimation of average thickness of the above-mentioned "disturbed alignment boundary" required almost 10 or more layers of liquid crystal molecules, and an experimental result that an insulating layer thickness calculated from an observable hysteresis for actual spontaneous polarization is almost 200 or larger Å. Such an experimental result may for example be obtained by forming insulating films having several different thicknesses in place of the coating film and measuring the amounts of hysteresis at that time to use a correlation between a hysteresis amount obtained by extrapolation to a film thickness of zero and Ps.

In the above description, the above-mentioned insulating boundary has been regarded as a model of "disturbed boundary", it is also possible that the insulating boundary is like an electrical double layer, or like a trapping boundary considered to be directly related with the vicinity of the substrate having a non-uniaxial alignment characteristic, or a high-resistivity surface state. In any of these cases, however, an explanation similar to the above of the phenomenon holds true, and the effect of low-resistivity film 6 may also be developed.

In the liquid crystal device of the present invention, the low resistivity film on the substrate having a non-uniaxial alignment characteristic may preferably be formed to have a volume resistivity of $10^4$–$10^8$ ohm.cm, more preferably by wet application. The preferred range will be described in some detail. [Upper limit: $10^8$ ohm.cm]

The upper limit is determined by a time constant condition as to whether a previous display state is electrically removed or not. In a drive of a ferroelectric liquid crystal having bistability, a reset signal (for ordinarily forming "black" state uniformly) is applied to a pixel before a prescribed pixel state is determined at the pixel. In order to avoid an adverse effect to image quality in a matrix drive, the reset period may preferably be set to at most 100 μsec or so. In order to effect an electrical removal of a previous state in such a period, a resistivity of at most $10^8$ ohm.cm is required from an approximate calculation as follows. Time constant for an equivalent circuit is given by:

$$(C1c+Ca) \times R1c \times Ra/(R1c+Ra),$$

wherein Ca: coating film capacitance, R1c: liquid crystal resistance, and Ra: coating film resistance. Now, it is assumed that the liquid crystal layer thickness is ca. 2 μm, coating film thickness is ca. 1000 Å, liquid crystal dielectric constant is ca. 6, and coating film dielectric constant is ca. 10. Further, $(C1c+Ca) \approx Ca$ and $Ra \ll R1c$ are assumed. Then, as time constant $\approx CaRa$, and $\gamma \approx \epsilon a \epsilon_0 \rho a < 100$ μsec ($\gamma$: time constant, $\epsilon a$: dielectric constant of the coating film and $\rho a$: resistivity of coating film), wherefrom $\rho a < 10^8$ ohm.cm. [Lower limit: $10^4$ ohm.cm]

The resistivity lower limit of the coating film is a condition for obviating an unnecessary voltage lowering due to a current flow to another pixel in a matrix structure and obviating a crosstalk between lines while ensuring the electrical removal of a previous state.

For example, in case of a matrix of 1000×1000 pixels, the resistance of a stripe electrode from an electricity supplying point to a point of 1000th pixel is ca. 1 k.ohm if the stripe electrode has a sheet resistivity of ca. 1 ohm/□. This coincides with the value for an actually produced transparent electrode formed at present. On the other hand, if a spacing between electrode stripes is assumed to be ca. 1/10 of the stripe width, the resistance between adjacent electrodes is given as 1/10000 of the sheet resistivity of the coating film. When a voltage lowering up to the 1000-th pixel is suppressed to at most 1/100, the sheet resistivity between the electrode stripes is required to be $10^6$ times as large. Thus, the sheet resistivity of the coating film has to be at least $10^9$ ohm/□, which corresponds to a resistivity of at least $5 \times 10^3$ ohm.cm, preferably at least $10^4$ ohm.cm, for a 500 Å-thick coating film.

Then, the manner of measuring a film volume resistivity referred to herein will be described with reference to FIGS. 9 and 10.

Figure 9:
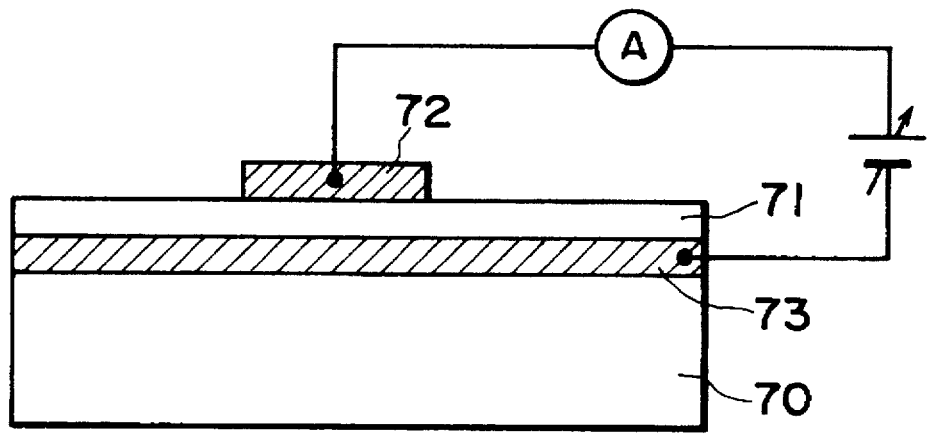
FIG. 9 is an illustration of a system for measuring a volume resistivity of a coating film or a passivation film in a thickness direction in a liquid crystal device according to the invention.
Figure 10A:
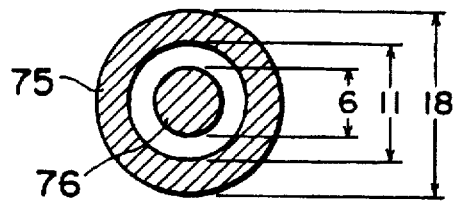
FIGS. 10A and 10B are respectively a schematic plan view of an electrode pattern and a sectional view of a system for measuring a volume resistivity of a coating film in a sheet extension direction in a liquid crystal device according to the invention.
Figure 10B:
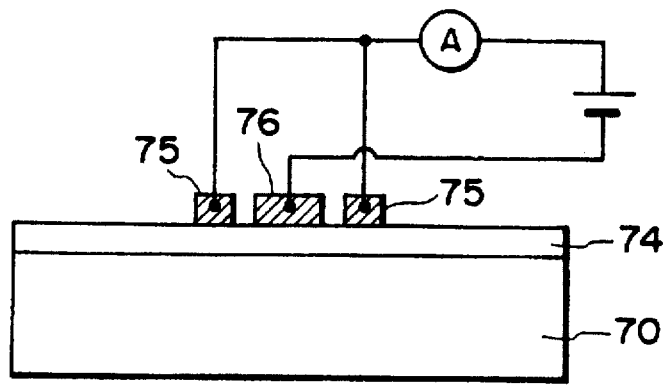

FIG. 9 is a schematic thicknesswise sectional view of a system for measuring a resistance of an objective film in its thickness direction. The system includes an objective film 71, through which a current is flowed between an e.g., 1 mm-dia. Al electrode 72 and an ITO electrode 73 formed on a glass substrate 70. FIG. 10B is a schematic sectional view of a system for measuring a resistance of an objective film 74 in a sheet extension direction thereof, in which a current is flowed between electrodes 75 and 76 both formed on the objective film 74 and having an electrode pattern as shown in FIG. 10A. As shown in FIG. 10A, the electrode 75 has an annular shape having an outer diameter of 18 mm and an inner diameter of 11 mm. The electrode 76 has a circular shape of 6 mm in diameter.

In case of disposing a film having a volume resistivity of $10^4$–$10^8$ ohm.cm on the substrate having a non-uniaxial alignment characteristic in the liquid crystal device according to the present invention, the durability of the device may be increased by disposing an inorganic film for providing a further increased withstand voltage below the film, e.g., between the film and the ITO electrode.

The inorganic film may preferably be formed by vapor deposition, more preferably by sputtering, of various inorganic materials, such as ZnO, $SnO_2$ and $TaO_x$. It is optimum to form a film having a thickness of ca. 1000–2000 Å and a resistivity in a thickness direction controlled within the range of $10^4$–$10^8$ ohm.cm by adjustment of a gas pressure of an environment gas, such as oxygen or argon, or by adjustment of the RF power therefor.

The preferable upper limit of resistivity of such an inorganic film for enhancing the withstand voltage is ca. $10^8$ ohm.cm as a condition for removing the previous state of switching similarly as the upper layer film.

The lower limit is also similar to that of the upper layer film. For example, the lower limit is determined so that, even when the liquid crystal layer causes a short circuit because of contamination of conductive foreign matter, it becomes possible to obviate a noticeable image defect at the short circuit part or surrounding part by suppressing a current flowing through the inorganic film. As an example of representative consideration, in case where an electrical path is formed across the liquid crystal layer thickness by contamination with a foreign matter having a size comparable to the cell thickness and the voltage lowering between pixels is suppressed to be $1/100$, the resistance thereat requires a resistance of 100 times a resistance of 1 k.ohm which is resistance from an electricity supplying end of an electrode stripe to an opposite end. In case where a short circuit area is 2 $\mu m \times 2$ $\mu m$ and the inorganic film has a thickness of 1000 Å, $\rho min \times 1 \times 10^{-5}/(2 \times 10^{-4})^2 \geq 1 \times 10^5$ (ohm), wherein *min: lower limit resistance, then $\rho min \geq 4 \times 10^2$ (ohm.cm). If the occurrence of short circuit at plural parts, a volume resistivity of ca. $10^4$ ohm.cm is desired.

In the liquid crystal device according to the present invention, if the substrate having a uniaxial alignment characteristic is provided with an electroconductive alignment control film, it is possible to further improve the device performance. Such an electroconductive alignment film may be formed of a charge transfer complex obtained by doping polypyrrole, polyaniline, etc., with, e.g., TCNQ (tetracyanobenzoquinodimethane), an electroconductivity-imparted material doped with sulfuric acid, etc., or ordinarily insulating alignment film material, such as polyimide, doped with an organic acid or inorganic acid, such as $LiCF_2SO_3$, respectively to provide a resistivity of ca. $10^4$–$10^8$ ohm.cm. Such an electroconductive alignment film may be provided with a uniaxial alignment characteristic, e.g., by rubbing it.

In the present invention, in case of forming such an inorganic film on the substrate having a uniaxial alignment characteristic or forming an electroconductive alignment control film on the substrate having a uniaxial alignment characteristic, both substrates are selectively controlled to satisfy the surface potential correlation therebetween. More specifically, an electroconductive alignment film is formed on the substrate having a uniaxial alignment characteristic and an inorganic film is formed on the substrate having a non-uniaxial alignment characteristic, while selecting the electroconductive alignment film and the inorganic film so as to provide the required difference and the same polarity of surface potentials therebetween.

Specific examples of respective members will now be described for a device structure shown in FIG. 1.

(1) Substrates (1 and 2 in FIG. 1)

One face-polished or both face-polished blue sheet glass (common to uniaxial substrate 1 and non-uniaxial substrate 2) having a 700 Å-thick or 1500 Å-thick ITO film (common to 3 and 5 in FIG. 1).

(2) Alignment control layer (4 in FIG. 1)

(i) A 30 Å-thick polyimide film formed by spin coating of a polyamic acid ("LP-64" available from Toray K.K.) and baking at 270° C., followed by rubbing.

(ii) A polyimide film formed by lamination of 5 monomolecular layers of a polyamic acid ("LP-64") by the LB method, followed by baking.

(iii) A 100 Å-thick film formed by spin coating of a polypyridine dispersion in formic acid and baking at 180° C., followed by rubbing.

(3) Layers on the substrate 2 having a non-uniaxial alignment characteristic (a) Coating film (6 in FIG. 1)

(i) A ca. 900 Å-thick baked film of siloxane ($SiO_x$) polymer containing antimony-doped $SnO_2$ ultrafine particles (size: ca. 100 Å) disposed therein.

(ii) A film of composite of titanium oxide, zirconiumoxide, silicon oxide, etc., containing antimony-doped $SnO_2$ ultrafine particles dispersed therein.

(b) Optional surface treating film (7 in FIG. 1)

(i) Silane coupling agent applied by spin coating.

(ii) A coating film identical to those in (2) above but with no aligning treatment.

(iii) No surface aligning treatment.

(4) Liquid crystal (8 in FIG. 1)

A ferroelectric liquid crystal showing a phase transition series on temperature decrease of Iso.→SmA→SmC*→Cryst., a spontaneous polarization (Ps) of 20 $nC/cm^2$ and a tilt angle of ca. 22 degrees.

Specifically prepared two-types of coating films (3)(a)(i) and (ii) above showed volume resistivities of ca. $10^4$ ohm.cm in both sheet extension direction and thickness direction measured according to the methods described with reference to FIGS. 9 and 10.

As described above with reference to some embodiments, according to the liquid crystal device of the present invention, it is possible to provide stable characteristics, inclusive of a minimized hysteretic effect due to a previous state (e.g., a threshold difference of at most 0.5 volt or below as an optical response hysteresis), a reduced switching asymmetry between two stable states (a difference in threshold of at most 1 volt between forward and backward switching between first and second stable states), and a reduced change in threshold due to long hours of drive or storage (e.g., a threshold change of at most 1 volt).

Hereinbelow, the present invention will be described more specifically based on experiment examples.

EXPERIMENTAL EXAMPLE 1

In this series of examples, liquid crystal devices each having a structure as shown in FIG. 1 was prepared in the following manner.

Table 1 appearing hereinafter inclusively shows materials, thickness and measured surface potentials of uniaxial alignment layers (4) and non-uniaxial alignment layers (6) used in the examples. The materials and preparation methods of the films shown in Table 1 were as follows.

[Uniaxial alignment layer 4]

A: A polyamic acid ("LP-64", available from Toray K.K.) was applied by spin coating and baked at 200° C. to form a 5 nm-thick polyimide film, followed by rubbing.

B: A polyamic acid (having a structure of an additional alkyl chain bonded to an imide ring precursor in the main chain of the LP-64) was applied by spin coating and baked at 200° C. to form a 5 nm-thick polyimide film, followed by rubbing.

[Non-uniaxial alignment layer 6]

a1: A 0.5% solution of silane coupling agent ("ODS-E", mfd. by Chisso K.K.) in ethanol was spin-coated and baked at 180° C. for 1 hour to form a 2.5 nm-thick film.

b1: A polysiloxane ($SiO_x$) containing antimony-doped $SnO_2$ ultrafine particles (size: ca. 10 nm) was applied and baked to form a 70 nm-thick film.

b2: A 140 nm-thick film was prepared similarly as b1 above.

c1: A polysiloxane ("GR 651L", mfd. by Techneglass Inc., U.S.A.; supplied through Showa Denko K.K.) containing surface-treated antimony-doped $SnO_2$ ultrafine particles (size: ca. 10 nm) was applied and baked to form a 30 nm-thick film.

c2: A 70 nm-thick film was prepared similarly as C1 above.

d1: The polysiloxane ("GR 651L") was applied and baked to form a 3 nm-thick film.

TABLE 1

| Material | Thickness (Å) | Surface potential (mV) |
|---|---|---|
| A | 50 | −220 |
| B | 50 | 50 |
| a1 | 25 | −110 |
| b1 | 700 | −180 |
| b2 | 1400 | −200 |
| c1 | 300 | +100 |
| c2 | 700 | +70 |
| d1 | 30 | +30 |

A, B: Uniaxial alignment layer material
a1, b1, b2, c1, c2, d1: Non-uniaxial alignment layer material

EXPERIMENTAL EXAMPLE 1-1

In this example, four devices each including a film of a uniaxial alignment layer 4 of A (in Table 1) having shown a relatively large negative surface potential of −220 mW were prepared.

More specifically, a 1.1 nm-thick glass plate having ca. 150 nm-thick ITO electrode was provided with a 50 nm-thick film of "LP-64" (A in Table 1). Then, the film was rubbed by a 80 mm-dia. rubbing roller about which nylon cloth was wound under the conditions of a roller rotation speed of 1000 rpm, a pressing depth of 0.3 mm, a feeding speed of 10 mm/sec relative to the substrate and four times of feeding, to be provided with a uniaxial alignment characteristic.

In this way, four substrates each having a uniaxial alignment layer were prepared.

Separately, four substrates having a non-uniaxial alignment characteristic were prepared by forming non-uniaxial alignment layers (6 in FIG. 1) of a1, b1, b2 and c1, respectively, and were superposed on each of the above prepared four substrates having a uniaxial alignment layer (4) with 2.0 μm-dia. spacer beads therebetween to prepare four types of blank cells, each of which was filled with a chiral smectic liquid crystal (ferroelectric liquid crystal) having a phase transition series on temperature decrease of Iso.→SmA→SmC*→Cryst., a spontaneous polarization of 30 nC/cm² (at 30° C.) and a tilt angle of ca. 24 degrees under heating and a reduced pressure, followed by gradual cooling (at a rate of 2° C./min) under normal pressure to prepare four types of liquid crystal devices each having a good alignment state.

Figure 11:
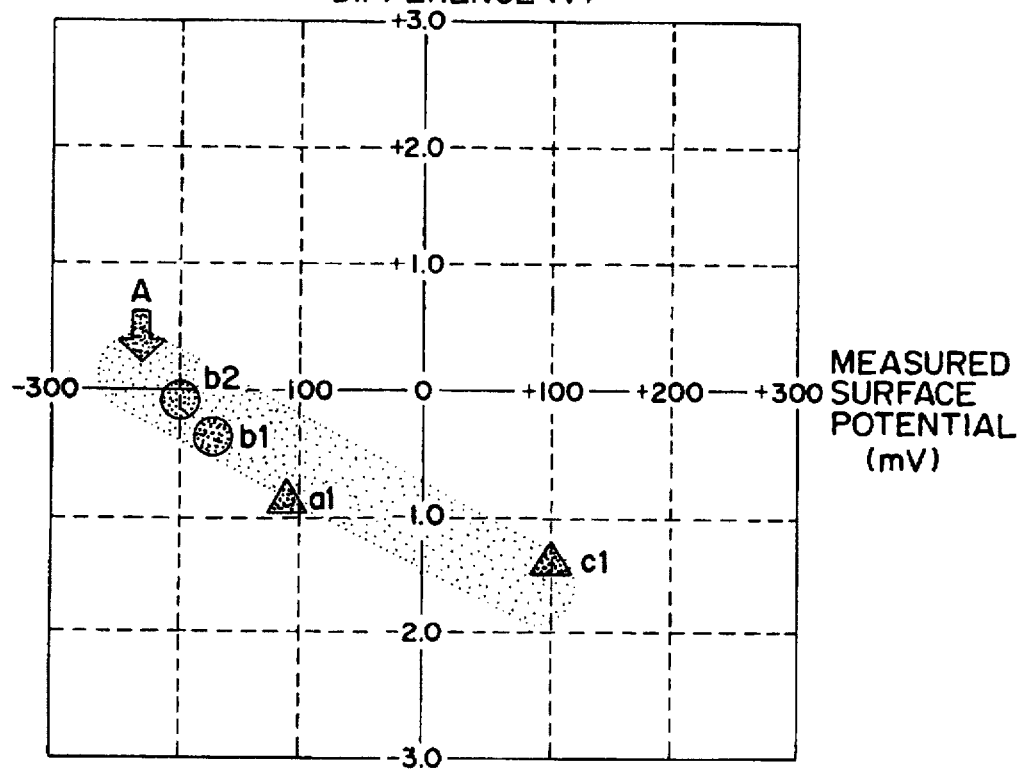
FIGS. 11 and 12 are graphs showing a relationship between a measured surface potential and a switching threshold in liquid crystal devices prepared in Experimental Examples 1 and 2, respectively.

The four devices were respectively supplied with positive and negative rectangular pulses each having a pulse width of 20 μsec to measure a threshold voltage difference between two directions of switching between two stable states. FIG. 11 shows plots of switching threshold difference (ordinate) versus measured surface potential values on the substrate having a non-uniaxial alignment characteristic (abscissa). In FIG. 11, a spot o represents a good level of switching threshold symmetry and a spot Δ represents an insufficient level of switching threshold symmetry. Further, a point of arrow A in FIG. 11 represents a measured surface potential of the substrate having a uniaxial alignment layer of A ("LP-64").

As is clear from FIG. 11, a strong correlation is observed between the switching threshold difference and the measured surface potential. More specifically, a known representative device having an asymmetrical structure including a non-uniaxial alignment layer of silane coupling agent a1 provided a surface potential difference (calculated as (surface potential on a uniaxial alignment layer)−(surface potential on a non-uniaxial alignment layer)) of −110 mV and resulted in a relatively large switching threshold difference of −0.8 volt ("large" or "small" being described based on an absolute value), but a device having a non-uniaxial alignment layer of b1 providing a smaller surface potential difference of −40 mV resulted in a switching threshold difference of −40 mV and a device having a layer of b2 (having a thickness two times the layer b1) providing a further small surface potential difference of −20 mV resulted in a substantially ideal symmetry as represented by a switching threshold difference of −0.1 volt. On the other hand, a device having a non-uniaxial alignment layer of c1 providing a very large surface potential difference of −320 mV resulted in a considerably large threshold difference of −1.4 volts while not causing a switching failure.

The correlation shown in FIG. 11 shows that it is possible to adequately suppress the surface potential difference to a small value of ±100 mV or below and adjust the polarity, thereby controlling the switching threshold difference to a level of ±1.0 volt or lower.

Further, in addition to the correlation regarding the absolute value of switching threshold, the polarity of the switching threshold difference shows a correlation such that the direction of higher switching threshold coincides with the switching direction from a stable state given by an internal voltage due to a surface potential difference. Thus, it is strongly suggested that the switching threshold difference is caused by the surface potential difference.

EXPERIMENTAL EXAMPLE 1-2

In this example, six devices each including a film of a uniaxial alignment layer 4 of B (in Table 1) having shown a positive surface potential of +50 mW were prepared.

More specifically, a 1.1 nm-thick glass plate having ca. 150 M-thick ITO electrode was provided with a 50 nm-thick film of B. Then, the film was rubbed by a 80 mm-dia. rubbing roller about which nylon cloth was wound under the conditions of a roller rotation speed of 1000 rpm, a pressing depth of 0.3 mm, a feeding speed of 10 mm/sec relative to the substrate and four times of feeding, to be provided with a uniaxial alignment characteristic.

In this way, six substrates each having a uniaxial alignment layer were prepared.

Separately, six substrates having a non-uniaxial alignment characteristic were prepared by forming non-uniaxial alignment layers (6 in FIG. 1) of a1, b1, b2, c1, C2 and d1, respectively, and were superposed on each of the above prepared six substrates having a uniaxial alignment layer (4) with 2.0 μm-dia. spacer beads therebetween to prepare six types of blank cells, each of which was filled with the same liquid crystal as used in Experimental Example 1-1 under heating and a reduced pressure, followed by gradual cooling (at a rate of 2° C./min) under normal pressure to prepare six types of liquid crystal devices each having a good alignment state.

Figure 12:
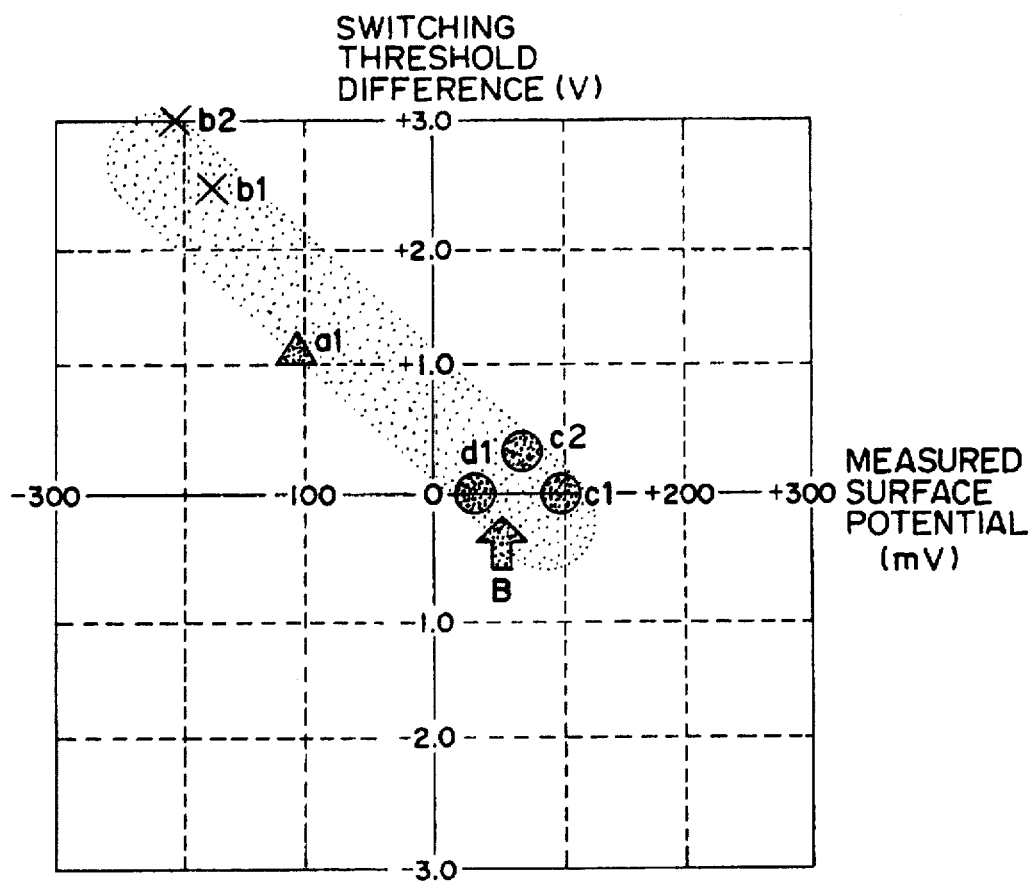

The six devices were respectively supplied with positive and negative rectangular pulses each having a pulse width of 20 μsec to measure a threshold voltage difference between two directions of switching between two stable states. FIG. 12 shows plots of switching threshold difference (ordinate) versus measured surface potential values on the substrate having a non-uniaxial alignment characteristic (abscissa). In FIG. 12, a spot o represents a good level of switching threshold symmetry, a spot △ represents a rather problematic level of switching threshold asymmetry a spot x represents a remarkably problematic level of switching asymmetry causing a switching failure, and a spot ⊚ represents a good switching threshold symmetry and a particularly well-suppressed deterioration with time. Further, a point of arrow B in FIG. 12 represents a measured surface potential of the substrate having a uniaxial alignment layer of B.

As is clear from FIG. 12, a strong correlation is observed between the switching threshold difference and the measured surface potential similarly as in the case of Experimental Example 1-1 using a uniaxial alignment layer of "LP-64". More specifically, a known representative device having an asymmetrical structure including a non-uniaxial alignment layer of silane coupling agent a1 provided a surface potential difference +150 mV as different from the case of using a uniaxial alignment layer of "LP-64" and resulted in a positively large switching threshold difference of +1.1 volt. The non-uniaxial alignment layers of b1 and b2 having given a good switching threshold in combination with the uniaxial alignment layer of "LP-64" provided very large surface potential differences of +230 mV and +250 mV, respectively, and resulted in switching failure, thus failing to measure the switching threshold difference. On the other hand, the non-uniaxial alignment layers of c1 (surface potential difference: −50 mV), c1 (−20 mV) and d1 (+20 mV) showing relatively small surface potential differences provided devices showing switching threshold differences of 0 volt, 0.4 volt and 0 volt, respectively. Thus, particularly the devices having the non-uniaxial alignment layers of c1 and d1 provided an ideal switching threshold symmetry.

FIG. 12 again shows that the switching threshold difference can be suppressed to a low level of ±1.0 volt or below by suppressing the surface potential difference to below ±100 mV.

Further, the device including the non-uniaxial alignment layer of d1 was found to effectively suppress the change with time of switching threshold which is liable to be caused in a device having an asymmetrical structure. This tendency was equally observed in devices having a surface potential difference between two substrates of below 100 mV and an absolute value of surface potential on each substrate of at most 50 mV. We understand that these results may be attributable to a correlation that a potential difference occurring between an electrode and an alignment film is an important factor causing a change with time of threshold value.

As described with reference to the above two Experimental Examples, there have been experimentally confirmed the presence of tendencies that the switching threshold difference approaches zero as the surface potential of a substrate having a non-uniaxial alignment characteristic approaches that of an opposite substrate having a uniaxial alignment characteristic (i.e., as the surface potential difference between two substrates approaches zero), that the direction of internal voltage due to a surface potential difference coincides with the direction of occurrence of switching threshold difference, and that the change with time of cell performances liable to be encountered in an asymmetrically structural cell is very effectively suppressed in case where the surface potentials of the uniaxial alignment substrate and the non-uniaxial alignment substrate are both small, preferably both at most 100 mV. It has been also confirmed the switch threshold difference is better removed in case where the surface potentials of both substrates are of the same polarity.

Further, as a comparison throughout Experimental Examples 1-1 and 1-2 above, the devices having non-uniaxial alignment layers of c1, c2 and d in Experimental Example 1-2 showed better performance in suppressing the appearance of monostability characteristic with time than the respective devices in Experimental Example 1-1. This may be attributable to the features that the devices of Experimental Example 1-2 had the same polarity of surface potentials, a smaller surface potential difference (of below 50 mV) and also the absolute values of surface potentials were suppressed to a small value on both substrates, thereby giving a smaller influence of the surface potential or dipoles of liquid crystal molecules.

EXPERIMENTAL EXAMPLE 2

In this series of examples, liquid crystal devices each having a structure as shown in FIG. 1 were prepared in the following manner.

Specific examples of respective members used in the examples are enumerated below for a device structure shown in FIG. 1.

(1) Substrates (1 and 2 in FIG. 1)

One face-polished or both face-polished blue sheet glass (common to uniaxial substrate 1 and non-uniaxial substrate 2) having a 700 Å-thick or 1500 Å-thick ITO film (common to 3 and 5 in FIG. 1).

(2) Alignment control layer (4 in FIG. 1)

(A) A 50 Å-thick polyimide film formed by spin coating of a polyamic acid ("LP-64" available from Toray K.K.) and baking at 200° C., followed by rubbing.

(B) A polyimide film formed by lamination of 5 mono-molecular layers of a polyamic acid ("LP-64") by the LB method, followed by baking at 200° C.

(C) A 50 Å-thick film formed by spin coating of a nylon-66 dispersion in formic acid and baking at 180° C., followed by rubbing.

(3) Layers on the substrate 2 having a non-uniaxial alignment characteristic

[Non-uniaxial alignment layer 6]

b1: A polysiloxane ($SiO_x$) containing antimony-doped $SnO_2$ ultrafine particles (size: ca. 100 Å) was applied and baked to form a 700 Å-thick film.

e1: A 900 Å-thick composite film of titanium oxide and silicon oxide containing the above antimony doped $SnO_2$ ultrafine particles.

c1: A polysiloxane ("GR 651L", mfd. by Techneglass Inc., U.S.A.: supplied through Showa Denko K.K.) containing surface-treated antimony-doped $SnO_2$ ultrafine particles (size: ca. 10 nm) was applied and baked to form a 300 Å-thick film.

The above films of b1, e1 and c1 were all baked at ca. 200° C.

(4) Liquid crystal (8 in FIG. 1)

A ferroelectric liquid crystal showing a phase transition series on temperature decrease of Iso.→SmA→SmC*→Cryst., a spontaneous polarization (Ps) of 30 $nC/cm^2$ and a tilt angle of ca. 24 degrees.

The above coating films (3) b1, e1 and c1 were all caused to contain the ultrafine particles in order to impart an electroconductivity and adjust the polarity. These films all showed a volume resistivity of $10^5$ ohm.cm in the thickness direction measured according to the method described with reference to FIG. 9.

Four liquid crystal devices (Examples 2-1 to 2-4) having a structure shown in FIG. 1 were prepared by including the above members and respectively subjected to a measurement of V-T characteristics by grounding the non-uniaxial alignment substrate 2 and applying a signal voltage to the uniaxial alignment substrate 1, and also measurement of asymmetrical switching threshold difference and hysteresis.

The structural features and the results of the evaluation of the respective devices are summarized in the following Table 2.

TABLE 2

| | Uniaxial alignment substrate | | Non-uniaxial alignment substrate** | | | | |
|---|---|---|---|---|---|---|---|
| Device Example | Alignment layer | surface potential | Coating film | surface potential | Volume resistivity | Threshold difference | Hysteresis |
| 2-1 | A (polyimide) $\gamma_{DP}$ = 43.9 dyn/cm | −220 (mV) | b1 (polysiloxane)-based film) $\gamma_{DP}$ = 44.5 dyn/cm | −180 (mV) | ~$10^5$ (ohm.cm) | −0.1 (V) | 0.9 (V) |
| 2-2 | A (polyimide) $\gamma_{DP}$ = 43.9 dyn/cm | −220 (mV) | c1 (composite film) $\gamma_{DP}$ = 44.6 dyn/cm | −200 (mV) | ~$10^5$ (ohm.cm) | −0.1 V | 0.8 (V) |
| 2-3 | C (nylon) $\gamma_{DP}$ = 42.7 dyn/cm | +270 (mV) | c1 (polysiloxane)-based film) $\gamma_{DP}$ = 26.5 dyn/cm | +100 (mV) | ~$10^5$ (ohm.cm) | −1.0 (V) | 0.6 (V) |
| 2-4 | B (polyimide) $\gamma_{DP}$ = 44.3 dyn/cm | +50 (mV) | c1 (polysiloxane-based film) $\gamma_{DP}$ = 26.5 dyn/cm | +100 (mV) | ~$10^5$ (ohm.cm) | +0 (V) | 0.5 (V) |

*$\gamma_{DP}$: Dispersion term of surface energy.
**No surface treatment was applied to the non-uniaxial alignment substrate.

As summarized in the above Table 2, the liquid crystal devices prepared in the above examples showed a reduced surface potential difference and identical-polarities thereof between both substrates. Accordingly, the liquid crystal devices showed a minimized hysteresis influenced by a previous state (e.g., an optical response hysteresis of 1 volt or below at the maximum), and a reduced asymmetry of switching between bistable state (e.g., a threshold difference of 1.0 volt or below between two directions of switching, thereby resulted in suppression of occurrence of defective domains. Further, even in a long period of drive or storage, the change in threshold characteristics was minimized (e.g., threshold change of at most 1 volt), thereby providing stable performances.

EXPERIMENTAL EXAMPLE 3

Figure 13:
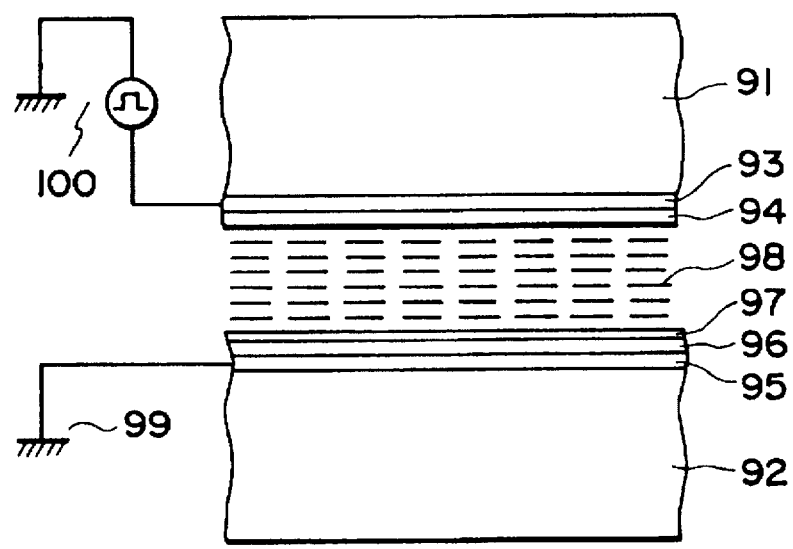
FIG. 13 is a sectional view of a liquid crystal device together with indication of a surface potential measurement system used in an Experimental Example appearing hereinafter.

FIG. 13 schematically shows a sectional view of a liquid crystal device structure prepared and tested in this Experimental Example. The liquid crystal device included a pair of substrates 91 and 92, and a liquid crystal layer 98 disposed therebetween. One substrate 91 was provided with electrodes 93 and an alignment control layer 94 for uniaxially aligning the liquid crystal 98 in the device. The other substrate 92 was provided with electrodes 95 and double-layered passivation films 96 and 97 forming non-uniaxial alignment layers. The device was prepared in the following manner.

First, the substrates 91 and 92 were respectively coated with 700 Å-thick ITO films by using an ordinary DC sputtering apparatus and an ITO target under the conditions of a power of 1 W/cm², sputtering gases of Ar at 90 SCCM and O₂ at 10 SCCM and a discharge time of 2.5 min. The ITO films were patterned by an ordinary wet etching process to form electrodes 93 and 95.

Then, the electrodes 93 on the substrate 91 were spin-coated with a polyamic acid ("LP-64", mfd. by Toray K.K.) under the conditions of 2700 rpm and 20 sec., followed by baking at 200° C. for 60 min. to form a 50 Å-thick polyimide film, which was then subjected to a rubbing treatment under the condition of a rotation speed of 1000 rpm, a pressing depth of 0.4 mm, a feed speed of 5 mm/sec and three times of rubbing in one direction, to form an alignment control film 94.

On the other hand, the electrodes 95 on the other substrate 92 were coated with a 1000 Å-thick ZnO film as a lower passivation film layer 96 by using an ordinary RF sputtering apparatus and a target of 10% ZnO under the conditions of a power of 5 W/cm², substrate heating at 200° C., sputtering gases of Ar at 90 SCCM and O₂ at 10 SCCM, a pressure of 3 mTorr and a discharge time of 1 min. Then, the substrate was further spin coated with a dispersion of SnOx ultrafine particles (size: ca. 100 Å) dispersed in a solution of oxidized melt matrix of SiOx, followed by baking at 200° C. for 90 min. to form a 1500 Å-thick passivation film upper layer 97.

Then, a dispersion of 2.2 μm-dia. SiO₂ fine particles was applied onto the alignment control film on the uniaxial alignment substrate and heated for fixation, and a dispersion of adhesive particles (size: ca. 5 μm; "Toraypearl", available from Toray K.K.) was applied onto the resultant film and heated for fixation.

Separately, a sealant was applied onto the other substrate 92 by a printer and prebaked at 90° C. for 5 min. The thus-treated substrate 92 was applied onto the above-processed substrate 91 and supplied with a pressure of 50 g-f/cm² by a press machine. Further, under application of an air pressure of an identical magnitude, the substrates were heated at 110° C. for 90 min. to cure the sealant.

A blank device prepared in the above-described manner was placed in an ordinary load lock-type vacuum chamber, which was then evacuated to a vacuum of $10^{-5}$ Torr. Then, the device was dipped within a liquid crystal reservoir heated to 95° C. under a vacuum of $10^{-2}$ Torr so that its injection port contacted the liquid crystal to inject a liquid crystal 98 (identical to the one used in Experimental Example 2), to prepare a liquid crystal device having a structure as shown in FIG. 13.

In advance, the uniaxial alignment control layer (94) on the substrate 91 and the passivation film (96, 97) on the substrate 92 were measured to show surface potentials of −220 mV and −120 mV, respectively.

The liquid crystal device prepared in the above described manner was examined with respect to the performance of one pixel by electrically connecting the electrodes 95 of the non-uniaxial alignment substrate to the grounds 99 and applying a signal voltage (100) to an electrode 93 on the uniaxial alignment substrate.

FIG. 14 shows a V-T (voltage-transmittance) characteristic of the liquid crystal device obtained by measuring the transmittance (T) of the device while varying the amplitude (V) of the signal voltage. A difference between two curves indicated by arrow of opposite directions represents a hysteresis which is ideally zero, but a hysteresis not exceeding ca. 5% of a drive voltage is practically acceptable.

Further, a difference between a solid line and a dashed line represents a difference caused by the direction of a spontaneous polarization of liquid crystal molecules when the liquid crystal is reset into a "black" state. For example, the solid line represents a characteristic in the case where the spontaneous polarization Ps (assumed to be negative) is directed toward the non-uniaxial alignment substrate side and the dashed line represents a characteristic in the case where Ps is directed toward the uniaxial alignment substrate side. The difference between the solid and dashed lines is desirably an ideal value of zero which means a perfect symmetry. In contrast thereto, the deviation in threshold may be referred to as an asymmetry. An asymmetry on the order of ±1 volt may be acceptable because the bistability potentials are not remarkably disturbed and a performance change with time such as switching failure or sticking is not so remarkable.

The V-T characteristic of the liquid crystal device of this Experimental Example 3 shown in FIG. 14 showed a hysteresis of 0.8 volt, and an asymmetry of ca. 0.5 volt, which are within practically acceptable ranges.

Further, when the liquid crystal device (panel) of this Example were subjected to a matrix drive, the device showed excellent performances, inclusive of no after image, quick responsiveness, no flickering, no growth of inferior display region, extremely good bistability, sufficient suppression of sticking and progress into a monostability characteristic, and a high reliability. Even in case of application of 30 volts between the matrix electrodes on both substrates, no pixel causing short circuit was observed.

EXPERIMENTAL EXAMPLE 4

In this example, a liquid crystal device having a sectional structure similar to the one in Experimental Example 3 (FIG. 13) was prepared in the following manner.

First, electrodes 93 and 95 were formed on substrates 91 and 92, respectively, in a similar manner as in Experimental Example 3.

Then, the electrodes 93 on the substrate 91 were spin-coated with a polyamic acid ("LP-64", mfd. by Toray K.K.) under the conditions of 2700 rpm and 20 sec., followed by baking at 200° C. for 60 min. to form a 50 Å-thick polyimide film, which was then subjected to a rubbing treatment under the condition of a rotation speed of 1000 rpm, a pressing depth of 0.4 mm, a feed speed of 5 mm/sec and three times of rubbing in one direction, to form an alignment control film 94.

On the other hand, the electrodes 95 on the other substrate 92 were coated with a 2000 Å-thick n-type polycrystalline SiC:H as a lower passivation film layer 96 by using an ordinary load lock-type parallel plate-type RF plasma CVD apparatus, under the conditions of a frequency of 13.56 MHz, a substrate heating temperature of 200° C., a power of 300 mW/cm$^2$, introduction gases of silane (SiH$_4$) at 40 SCCM, isobutane (i-C$_4$H$_{10}$) at 300 SCCM, hydrogen-diluted 0.1 phosphine (PH$_3$/H$_2$:0.1%) at 10 SCCM, a pressure of 0.2 Torr, and a discharge time of 30 min.

Then, the substrate was further spin coated with a dispersion of SnO$_x$ ultrafine particles (size: ca. 100 Å) dispersed in a solution of oxidized melt matrix of SiO$_x$, followed by baking at 200° C. for 90 min. to form a 1500 Å-thick passivation film upper layers 97.

A liquid crystal device was prepared by using the above-treated substrates 91 and 92 otherwise in the same manner as in Experimental Example 3 including application and liquid crystal injection.

The uniaxial alignment control layer (94) on the substrate 91 and the passivation film (96, 97) on the substrate 92 were measured to show surface potentials of −220 mV and −130 mV, respectively.

The liquid crystal device prepared in the above described manner was examined in the same manner as in Experimental Example 3.

As a result, the V-T characteristic of the liquid crystal device showed a hysteresis of 0.6 volt, and an asymmetry of ca. 0.5 volt, which are within practically acceptable ranges. Further, when the liquid crystal device (panel) of this Example were subjected to a matrix drive, the device showed excellent performances, inclusive of no after image, quick responsiveness, no flickering, no growth of inferior display region, extremely good bistability, sufficient suppression of sticking and progress into a monostability characteristic, and a high reliability. Further the device showed a sufficient margin regarding the drive voltage and a withstand voltage exceeding 30 volts between the matrix electrodes on both substrates.

EXPERIMENTAL EXAMPLE 5

In this example, a liquid crystal device having a sectional structure similar to the one in Experimental Example 3 (FIG. 13) was prepared in the following manner.

First, electrodes 93 and 95 were formed on substrates 91 and 92, respectively, in a similar manner as in Experimental Example 3.

Then, the electrodes 93 on the substrate 91 were spin-coated with a polyamic acid ("LP-64", mfd. by Toray K.K., 0.7 wt. %) under the conditions of 2700 rpm and 20 sec., followed by baking at 200° C. for 60 min. to form a 50 Å-thick polyimide film, which was then subjected to a rubbing treatment under the condition of a rotation speed of 1000 rpm, a pressing depth of 0.4 mm, a feed speed of 5 mm/sec and three times of rubbing in one direction, to form an alignment control film 94.

On the other hand, the electrodes 95 on the other substrate 92 were coated with a 1500 Å-thick lower passivation film layer 96 formed by spin-coating a silica solution containing antimony-doped SnO$_2$ ultrafine particles (size: ca. 100 Å) at a rotation speed of 1500 rpm for 20 sec. and subsequent baking at 200° C. for 60 min.

Then, the substrate 92 was further spin-coated with a siloxane solution at 1500 rpm for 20 sec., followed by baking at 200° C. for 60 min. to form a. 50 Å-thick polysiloxane film as an upper passivation film layer 97.

A liquid crystal device was prepared by using the above-treated substrates 91and 92 otherwise in the same manner as in Experimental Example 3 including application and liquid crystal injection.

The uniaxial alignment control layer (94) on the substrate 91 and the passivation film (96, 97) on the substrate 92 were measured to show surface potentials of −220 mV and −100 mV, respectively.

The liquid crystal device prepared in the above described manner was examined in the same manner as in Experimental Example 3.

As a result, the V-T characteristic of the liquid crystal device showed a hysteresis of 0.4 volt, and an asymmetry of ca. 0.5 volt, which are within practically acceptable ranges.

Further, when the liquid crystal device (panel) of this Example were subjected to a matrix drive, the device showed excellent performances, inclusive of no after image, quick responsiveness, no flickering, no growth of inferior display region, extremely good bistability, sufficient suppression of sticking and progress into a monostability characteristic, and a high reliability.

EXPERIMENTAL EXAMPLE 6

In this series of examples, liquid crystal devices each having a structure as shown in FIG. 1 was prepared by using the following structural members.

Substrates of one face-polished or both face-polished soda glass plates each coated with a 700 Å-thick or 1500 Å-thick ITO film as a transparent electrode were provided.

Then, some of the above substrates were subjected to spin coating of a polyimide precursor which was either one or a mixture of the following S1 and S2, followed by baking at 200° C. and rubbing to form a 50 Å-thick polyimide alignment film.

Thus, uniaxial alignment substrates were prepared.

S1: Polyamic acid ("LP-64", mfd. by Toray K.K.)

S2: Polyamic acid having a structure of "LP-64" further having an alkyl chain into the main chain of "LP-64".

Then, non-uniaxial alignment substrates were prepared in the following manner.

The film 6 was prepared by spin coating of either one or a mixture of the following S3 and S4, followed by baking at 200° C. to form a 1500 Å-thick film. No rubbing or further treatment was applied thereto.

S3: A polysiloxane matrix source ("GR 651L", mfd. by Techneglass Inc. U.S.A.) containing antimony-doped $SnO_2$ ultrafine particles dispersed therein.

S4: Silica matrix source containing antimony-doped $SnO_2$ ultrafine particles.

A ferroelectric chiral smectic liquid crystal showing phase transition series on temperature decrease of Iso.0→SmA→SmC*→Cryst., a spontaneous polarization (Ps) of 30 $nC/cm^2$ (at 30° C.) and a tilt angle of ca. 24 degrees, was provided.

The above coating materials S3 and S4 were caused to contain the ultrafine particles in order to impart an electroconductivity and adjust the polarity. The resultant films all showed a volume resistivity of $10^5$ ohm.cm in the thickness direction measured according to the method described with reference to FIG. 9.

Liquid crystal device samples No. 1–5 were prepared by using the above-mentioned members. Reference device (Sample No. 1) was prepared by using a uniaxial alignment substrate having a rubbed polyimide-alignment film formed from 100% of Polyamic acid S2 and a non-uniaxial alignment substrate having a non-rubbed film formed from 100% of material S4 (silica matrix containing antimony-doped $SnO_2$ particles dispersed therein). Between these substrates, the above-mentioned liquid crystal was injected to provide a liquid crystal device containing the liquid crystal in chiral smectic C phase.

Sample No. 2 device was prepared from the same uniaxial alignment substrate as in No. 1 and a non-uniaxial alignment substrate having a non-rubbed film from a 50:50 mixture of the above-mentioned material S3 (polysiloxane matrix ("GR 651L") containing antimony-doped $SnO_2$ materials) and S4 used in No. 1 and having a volume resistivity on the order of $10^5$ ohm.cm. The other features were the same as No. 1.

Sample No. 3 device was prepared from a uniaxial alignment substrate having a rubbed film formed from a 50:50 mixture of materials S1 and S2 and a non-uniaxial alignment substrate having a non-rubbed film formed from a 65:35 mixture of materials S3 and S4. Sample No. 4 was prepared from the same uniaxial alignment substrate as in Sample No. 3 and the same non-uniaxial alignment substrate as in Sample No. 2.

Sample No. 5 was prepared from a uniaxial alignment substrate having a rubbed film formed from 100% of material S1 and a non-uniaxial alignment substrate having a non-rubbed film formed from a 10:90 mixture of materials S3 and S4.

Each liquid crystal device sample prepared in the above-described manner was subjected to a repetitive switching test wherein switching between two stable states U1 and U2 was repeated under prescribed environmental conditions to repeatedly measure a threshold $V_1$ for switching from the first stable state U1 to the second stable state U2, a threshold $V_2$ for switch from U2 to U1 and then a threshold difference $|V_1-V_2|$.

The results were normalized by determining the threshold difference of Reference Sample No. 1 as 1.0 and the threshold variation of Reference Sample No. 1 as also 1.0. The performances of the respective devices were evaluated based on the threshold difference according to the standard of □:≧0.9, △: 0.6–0.9, o: 0.4–0.6 and ⊙: below 0.4.

The results are summarized in Table 3 below.

TABLE 3

| Device Sample No. | 1 | 2 | 3 | 4 | 5 |
|---|---|---|---|---|---|
| Uniaxial substrate S1:S2 | 0:100 | 0:100 | 50:50 | 50:50 | 100:0 |
| Non-uniaxial substrate S3:S4 | 0:100 | 50:50 | 65:35 | 50:50 | 10:90 |
| Evaulation | — | □ | o | ⊙ | ⊙ |

EXPERIMENTAL EXAMPLE 7

Liquid crystal devices were prepared by repeating the procedure of preparation of Sample No. 5 device in Experimental Example 6 except that the non-rubbed films on the non-uniaxial alignment substrate were prepared by using mixture materials containing materials S3 and S4 in different ratios so as to provide surface potentials on the films varying in the range of +100 mV to −180 mV. The other features were the same as in Sample No. 5 device.

As a result, it was confirmed that good results were obtained in case where the non-uniaxial alignment substrate showed a surface alignment which gave a small difference (of preferably at most 50 mV in terms of an absolute value) from and/or had the same polarity as the surface potential (−220 mV) of the uniaxial alignment substrate.

EXPERIMENTAL EXAMPLE 8

Liquid crystal devices were prepared by repeating the procedure of preparation of Sample No. 2 device in Experimental Example 6 except that the non-rubbed films on the non-uniaxial alignment substrate were prepared by using mixture materials containing materials S3 and S4 in different ratios so as to provide surface potentials on the films varying in the range of +100 mV to −180 mV. The other features were the same as in Sample No. 2 device.

As a result, it was again confirmed that good results were obtained in case where the non-uniaxial alignment substrate showed a surface alignment which gave a small difference (of preferably at most 50 mV in terms of an absolute value)

from and/or had the same polarity as the surface potential (+50 mV) of the uniaxial alignment substrate.

The results of the above Experimental Example 6–8 show that the surface potential characteristic of a non-uniaxial alignment substrate can be controlled by a simple step of using a mixture of different materials for constituting a non-uniaxial alignment film, thereby providing a liquid crystal device showing good switching characteristics even in a continuous drive.

EXPERIMENTAL EXAMPLE 9

EXPERIMENTAL EXAMPLE 9-1

Liquid crystal devices (Sample Nos. 11–15) each having a structure as shown in FIG. 1 were prepared in the following manner.

Each of two glass substrates for each sample device had a thickness of 1.1 nun and provided with a transparent electrode of a 150 nm-thick ITO film.

Five substrates on the uniaxial alignment side were respectively provided with 5 nm-thick rubbed films formed from mixtures of nylon-6,6 having a recurring unit structure shown below and polypyridinethiophene (PYPy) having a recurring unit structure shown below in mixing ratios of 100:0, 90:10, 75:25, 50:50 and 0:100, respectively. The rubbed films on the uniaxial alignment substrates showed measured surface potentials of +270 mV, –50 mV, –190 mV, –210 mV and –350 mV, respectively.

Nylon-6,6

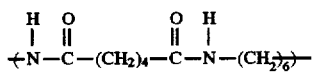

Polypyridinethiophene

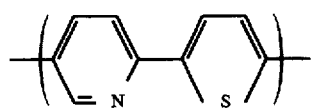

Incidentally, the rubbing was performed by using a 80 nm-dia. rubbing roller, about which nylon-planted cloth was wound, under the conditions of a roller rotation speed of 1000 rpm, a pressing depth of the cloth onto the substrate of 0.4 mm, a substrate feed rate of 5 mm/sec and 3 times of substrate feed.

Non-uniaxial alignment substrates were prepared by coating the above-mentioned ITO-coated glass substrates with a 0.5 wt. %-solution in ethanol of a silane coupling agent ("ODS-E", mfd. by Chisso K.K.) by spin coating under the conditions of 2000 rpm and 20 sec., followed by drying at 180° C. for 1 hour. The film on the substrate showed a surface potential of –110 mV.

Five blank cells were prepared by applying 5 pairs of the uniaxial alignment substrate and the non-uniaxial alignment substrate via 2.0 µm-dia. spacer beads, and filled with a ferroelectric liquid crystal showing a phase transition series on temperature decrease of Iso.→SmA→SmC*→Cryst., a spontaneous polarization (Ps) of 30 nC/cm² (at 30° C.) and a tilt angle of ca. 24 degrees and heated to isotropic phase by utilizing a capillary effect under a reduced pressure, followed by restoration to normal pressure, and cooling at a rate of 2° C./min. to prepare 5 sample devices, which are referred to as Sample Nos. 11–15, respectively.

EXPERIMENTAL EXAMPLE 9-2

Liquid crystal devices (Sample Nos. 16–18) were prepared in the following manner.

Each of two glass substrates for each sample device had a thickness of 1.1 mm and provided with a transparent electrode of a 150 nm-thick ITO film.

Three substrates on the uniaxial alignment side were respectively provided with 5 nm-thick films formed from mixtures of a polyamic acid (PI-A) (of "LP-64", mfd. by Toray K.K.) and a polyamic acid (PI-B) (having a structure formed by adding an alkyl chain to the polyimide precursor portion of the "LP-64" in the main chain structure) in mixing ratios of 75:25, 50:50 and 10:90, respectively. The thus formed films were respectively rubbed by using a 80 nm-dia. rubbing roller about which nylon-planted cloth was wound, under the conditions of a roller rotation speed of 1000 rpm, a pressing depth of the cloth onto the substrate of 0.3 mm, a substrate feed rate of 10 mm/sec and 4 times of substrate feed. The rubbed films on the uniaxial alignment substrates showed measured surface potentials of –160 mV, –120 mV and –30 mV, respectively.

Non-uniaxial alignment substrates were prepared by coating the above-mentioned ITO-coated glass substrates with a 0.5 wt. %-solution in ethanol of a silane coupling agent ("ODS-E", mfd. by Chisso K.K.) by spin coating under the conditions of 2000 rpm and 20 sec., followed by drying at 180° C. for hour. The film on the substrate showed a surface potential of –110 mV.

Three blank cells were prepared by applying 3 pairs of the uniaxial alignment substrate and the non-uniaxial alignment substrate via 2.8 µm-dia. spacer beads, and filled with the same ferroelectric liquid crystal in the same manner as in the above Experimental Example 9-1 to prepare 3 sample devices, which are referred to as Sample Nos. 16–18, respectively.

EXPERIMENTAL EXAMPLE 9-3

A liquid crystal device (Sample No. 19) was prepared in the same manner.

A pair of glass substrates each having a thickness of 1.1 mm and provided with a 150 nm-thick ITO electrode were provided.

A uniaxial alignment substrate was prepared by forming a 5 nm-thick film of nylon-6,6 on one of the glass substrates and rubbing the film by using a 80 nm-dia. rubbing roller, about which nylon-planted cloth was wound, under the conditions of a roller rotation speed of 1000 rpm, a pressing depth of the cloth onto the substrate of 0.4 mm, a substrate feed rate of 5 mm/sec and 3 times of substrate feed. The uniaxial alignment substrate having the rubbed film showed a surface potential of +270 mV.

A non-uniaxial alignment substrate was prepared by coating the above-mentioned ITO-coated glass substrate with a 5 nm-thick coating layer of polysiloxane. The coating layer on the substrate showed a surface potential of +50 mV.

A blank cell was prepared by applying the pair of the uniaxial alignment substrate and the non-uniaxial alignment substrate via 2.0 µm-dia. spacer beads, and filled with the same ferroelectric liquid crystal in the same manner as in Experimental Example 9-1 above to prepare a liquid crystal device, which is referred to as Sample No. 19.

Each of the above-prepared devices of Samples Nos. 11–19 was evaluated in the following manner. Each device was supplied with two polarities of pulses to cause two directions of switching between first and second states to measure a threshold difference between two directions of the switching. The measurement was performed under various environmental temperature condition, and an average threshold difference was obtained.

The results were normalized by determining the threshold difference of Sample No. 11 as 1.0. The other sample devices were evaluated by a relative magnitude of threshold difference, a smaller value of which represents a better performance, and indicated in the following Table 4 according to the standard of □:≧0.9, Δ: 0.6–0.8, o: 0.3–0.5 and ⊙:0.2.

The results of Table 4 shows that Samples Nos. 12, 13, 14, 16, 17 and 18 resulted in at least 50 of reduction in threshold difference compared with Reference Sample No. 11. Particularly, Samples Nos. 16 and 17 having a small surface potential difference between both substrates resulted in extremely good switching threshold symmetry.

TABLE 4

| Device sample No. | Uniaxial alignment substrate | | Non-uniaxial alignment substrate | | Evaluation |
|---|---|---|---|---|---|
| | Film | Surface potential (mV) | Film | Surface potential (mV) | |
| 11 | (nylon-6,6: PTPy) 100:0 | +270 | ODSE | −110 | □ |
| 12 | (nylon-6,6: PTPy) 90:10 | −50 | ODSE | −110 | o |
| 13 | (nylon-6,6: PTPy) 75:25 | −190 | ODSE | −110 | o |
| 14 | (nylon-6,6: PTPy) 50:50 | −210 | ODSE | −110 | o |
| 15 | (nylon-6,6: PTPy) 0:100 | −350 | ODSE | −110 | Δ |
| 16 | (PI-A: PI-B) 75:25 | −160 | ODSE | −110 | o |
| 17 | (PI-A: PI-B) 50:50 | −120 | ODSE | −110 | ⊙ |
| 18 | (PI-A: PI-B) 10:90 | −30 | ODSE | −110 | o |
| 19 | Nylon-6,6 100 | +270 | polysiloxane | +50 | Δ |

The results in the above Table 4 show that the surface potential characteristic of a uniaxial alignment substrate can be controlled by a simple step of using a mixture of different organic polymer materials for constituting a uniaxial alignment film, thereby providing a liquid crystal device showing good switching characteristics and a large drive margin under various environmental conditions.

What is claimed is:

1. A liquid crystal device, comprising a pair of oppositely disposed substrates including a first substrate-having a uniaxial alignment characteristic and a second substrate having a non-uniaxial alignment characteristic and a liquid crystal disposed between the first and second substrates, wherein said first and second substrates have surface potentials of an identical polarity and providing a difference therebetween of less than 50 mV in terms of an absolute value at their liquid crystal-contacting surfaces.

2. A liquid crystal device according to claim 1, said difference between the surface potentials of the first and second substrates is at most 30 mV.

3. A liquid crystal device according to claim 1, wherein the surface potentials of the first and second substrates are substantially identical to each other.

4. A liquid crystal device according to claim 1, wherein said second substrate having a non-uniaxial alignment characteristic is provided with a film for adjusting the surface potential.

5. A liquid crystal device according to claim 1 wherein said first substrate having a uniaxial alignment characteristic is provided with a film having a volume resistivity in the range of $10^4$–$10^8$ ohm.cm.

6. A liquid crystal device according to claim 4, wherein said second substrate having a non-uniaxial alignment characteristic is provided with a coating film with fine particles dispersed therein.

7. A liquid crystal device according to claim 6, wherein the fine particles have a particle size of 30–150 Å.

8. A liquid crystal device according to claim 6, wherein the fine particles comprise an oxide which is doped with an electroconductivity-controlling impurity.

9. A liquid crystal device according to claim 8, wherein the fine particles comprise $SnO_x$ doped with antimony.

10. A liquid crystal device according to claim 1, wherein said first substrate having a uniaxial alignment characteristic is provided with an alignment control film comprising a polymer film subjected to a uniaxial aligning treatment.

11. A liquid crystal device according to claim 1, wherein each of said first and second substrate has a surface potential of at most 100 mV in terms of an absolute value.

12. A liquid crystal device according to claim 1 wherein said second substrate having a non-uniaxial alignment characteristic has a surface energy of at most 30 dynes/cm at its liquid crystal-contacting boundary.

13. A liquid crystal device according to claim 1, wherein said second substrate having a non-uniaxial alignment characteristic has a surface energy larger than that of said first substrate having a uniaxial alignment characteristic at their liquid crystal-contacting boundaries.

14. A liquid crystal device according to claim 1 wherein said second substrate having a non-uniaxial alignment characteristic has a surface energy of at least 40 dynes/cm at its liquid crystal-contacting boundary.

15. A liquid crystal device according to claim 4, wherein said film for adjusting the surface potential on the second substrate having a non-uniaxial alignment characteristic is a laminate film including a plurality of element films.

16. A liquid crystal device according to claim 15, wherein said plurality of element films in the laminate film provide mutually different surface potentials, and the laminate film shows a surface potential which is intermediate said different surface potentials.

17. A liquid crystal device according to claim 15, wherein an element film closest to the substrate among the plurality of element films is a film comprising a polycrystalline metal oxide or a polycrystalline semiconductor, each doped with an electroconductivity-controlling impurity.

18. A liquid crystal device according to claim 17, wherein said film comprising a polycrystalline metal oxide or a polycrystalline semiconductor has a volume resistivity of $10^4$–$10^8$ ohm.cm in its thickness direction and a volume resistivity of $10^6$–$10^9$ ohm.cm in its film extension direction.

19. A liquid crystal device according to claim 15, wherein an element film closest to the substrate among the plurality of element films is a film comprising a matrix containing dispersed therein fine particles doped with an electroconductivity-controlling impurity.

20. A liquid crystal device according to claim 19, wherein said film comprising a matrix containing therein fine particles has a volume resistivity of $10^4$–$10^8$ ohm.cm.

21. A liquid crystal device according to claim 4, wherein said film for adjusting the surface potential on the second substrate having a non-uniaxial alignment characteristic comprises a mixture of plural different materials.

22. A liquid crystal device according to claim 21, wherein said film has a volume resistivity of $10^4$–$10^8$ ohm.cm.

23. A liquid crystal device according to claim 21, wherein said film comprises a matrix and fine particles having a particle size of 30–300 Å dispersed in the matrix.

24. A liquid crystal device according to claim 23, wherein said fine particles have a particle size of 30–150 Å.

25. A liquid crystal device according to claim 23, wherein said matrix comprises silica or siloxane polymer.

26. A liquid crystal device according to claim 21, wherein said film has a thickness of 300–5000 Å.

27. A liquid crystal device according to claim 21 wherein said substrate having a uniaxial alignment characteristic has thereon an alignment film subjected to a uniaxial alignment treatment, said alignment film comprising a mixture of plural organic polymer materials.

28. A liquid crystal device according to claim 1, wherein said substrate having a uniaxial alignment characteristic is provided with an alignment film providing the uniaxial alignment characteristic, said alignment film comprising a mixture of plural organic polymer materials each capable of forming an alignment film showing a uniaxial alignment characteristic.

29. A liquid crystal device according to claim 1, wherein said liquid crystal is a liquid crystal showing a chiral smectic phase.

30. A liquid crystal device according to claim 29, wherein said liquid crystal is free from cholesteric phase.

31. A liquid crystal device according to claim 1, wherein said liquid crystal comprises a composition containing a fluorine-containing mesomorphic compound having a central core to which a fluorocarbon terminal portion and a hydrocarbon terminal portion are connected, and showing a smectic phase or a latent smectic phase.

32. A liquid crystal device according to claim 1, wherein said liquid crystal is a ferroelectric liquid crystal.

33. A liquid crystal device according to claim 1, wherein said liquid crystal is an anti-ferroelectric liquid crystal.

34. A liquid crystal device according to claim 1, showing a switching threshold difference of at most 1.0 volt.

35. A liquid crystal device, comprising a pair of oppositely disposed substrates including a first substrate having a uniaxial alignment characteristic and a second substrate having a non-uniaxial alignment characteristic and a liquid crystal disposed between tie first and second substrates, wherein
said first and second substrates have surface potentials of an identical polarity at their liquid crystal, contacting surfaces.

36. A liquid crystal device according to claim 35, wherein said second substrate having a non-uniaxial alignment characteristic is provided with a film for adjusting the surface potential.

37. A liquid crystal device according to claim 36, wherein said film provided to the second substrate has a volume resistivity in the range of $10^4$–$10^8$ ohm.cm.

38. A wherein said film provided to the second substrate 36, where said film provided to the second substrate comprises a matrix and fine particles dispersed within the matrix.

39. A liquid crystal device according to claim 36, wherein said film provided to the second substrate is a laminate film including a plurality of element films.

40. A liquid crystal device according to claim 39, wherein said plurality of element films in the laminate film provide mutually different surface potentials, and the laminate film shows a surface potential which is intermediate said different surface potentials.

41. A liquid crystal device according to claim 39, wherein an element film closest to the substrate among the plurality of element films is a film comprising a polycrystalline metal oxide or a polycrystalline semiconductor, each doped with an electroconductivity-controlling impurity.

42. A liquid crystal device according to claim 35, herein said liquid crystal is a chiral smectic liquid crystal.

43. A liquid crystal device according to claim 42, wherein said liquid crystal causes a successive phase transition in the order of isotropic phase, smectic A phase and chiral smectic phase on temperature decrease.

44. A liquid crystal device according to claim 35, wherein said first substrate having a uniaxial alignment characteristic is provided with an alignment control film comprising a polymer film subjected to a uniaxial aligning treatment.

45. A liquid crystal device according to claim 35, wherein the surface potentials of the first and second substrates provide a difference therebetween of at most 100 mV in terms of an absolute value.

46. A liquid crystal device according to claim 35, wherein each of the surface potentials of the first and second substrates is at most 100 mV in terms of an absolute value.

47. A liquid crystal device according to claim 35, showing a switching threshold difference of at most 1.0 volt.

48. A liquid crystal device, comprising a pair of oppositely disposed substrates including a first substrate having a uniaxial alignment characteristic and a second substrate having a non-uniaxial alignment characteristic and a liquid crystal disposed between the first and second substrates, wherein
said second substrate having a non-uniaxial alignment characteristic is provided with a film having a volume resistivity in the range of $10^4$–$10^8$ ohm.cm.

49. A liquid crystal device according to claim 48, wherein said second substrate having a non-uniaxial alignment characteristic has a surface energy larger than that of said first substrate having a uniaxial alignment characteristic respectively as measured according to the liquid droplet contact angle measurement method at their liquid crystal-contacting boundaries.

50. A liquid crystal device according to claim 48, wherein said film provided to the second substrate is a coating film.

51. A liquid crystal device according to claim 48, wherein said coating film has an a surface unevenness of at least 200 Å.

52. A liquid crystal device according to claim 51, wherein said coating film comprises a matrix and electroconductive particles having a particle size 30–300 Å dispersed in the matrix.

53. A liquid crystal device according to claim 52, wherein said matrix comprises a siloxane polymer.

54. A liquid crystal device according to claim 48, wherein said second substrate having a non-uniaxial alignment characteristic is further provided with an inorganic film having a volume resistivity of $10^4$–$10^8$ ohm.cm in its thickness direction directly below said film having a volume resistivity in the range of $10^4$–$10^8$ ohm.cm.

55. A liquid crystal device according to claim 48, wherein said first substrate having a uniaxial alignment characteristic is provided with an alignment control layer having a volume resistivity in the range of $10^4$–$10^8$ ohm.cm.

56. A liquid crystal device according to claim 48, wherein said liquid crystal is a chiral smectic liquid crystal.

57. A liquid crystal device according to claim 56, wherein said liquid crystal causes a successive phase transition in the order of isotropic phase, smectic A phase and chiral smectic phase on temperature decrease.

* * * * *

UNITED STATES PATENT AND TRADEMARK OFFICE
CERTIFICATE OF CORRECTION

PATENT NO. : 5,666,217
DATED : September 9, 1997
INVENTOR(S) : SHUZO KANEKO, ET AL.

It is certified that error appears in the above-identified patent and that said Letters Patent is hereby corrected as shown below:

COLUMN 1

Line 28, "has" should read --have--;
Line 58, "(SmH*)in" should read --(SmH*) in--; and
Line 67, "Considered" should read --considered--.

COLUMN 2

Line 45, "maybe" should read --may be--.

COLUMN 3

Line 20, "64-49023has" should read --64-49023 has--; and
Line 27, "rooms" should read --room--.

COLUMN 4

Line 15, "crystal contacting" should read --crystal-contacting--.

COLUMN 5

Line 21, "istic" should read --istic"--;
Line 27, "difference" should read --differences--; and
Line 65, "these" should read --the--.

COLUMN 6

Line 25, "various metal or metal oxide" should read --various metals or metal oxides--.

UNITED STATES PATENT AND TRADEMARK OFFICE
CERTIFICATE OF CORRECTION

PATENT NO. : 5,666,217

DATED : September 9, 1997

INVENTOR(S) : SHUZO KANEKO, ET AL.

It is certified that error appears in the above-identified patent and that said Letters Patent is hereby corrected as shown below:

COLUMN 7

Line 26, "5 082 587" should read --5,082,587--; and
Line 56, "composite-" should read --composite--.

COLUMN 8

Line 8, "al" should read --al.--;
Line 18, "crystal contacting" should read --crystal-contacting--;
Line 36, "after" should read --once--;
Line 37, "is" should read --are--;
Line 38, "and then" should read --,-- (comma);
Line 46, delete "(" (parenthesis); and
Line 66, "Specific-surface" should read --Specific surface--.

COLUMN 9

Line 62, "in-switching" should read --in switching--.

COLUMN 10

Line 16, "switching asymmetry" should read --asymmetrical switching characteristic appeared--;
Line 41, "a" should read --an--; and
Line 52, "an" should read --and--.

COLUMN 11

Line 13, "charge" should read --charged--.

UNITED STATES PATENT AND TRADEMARK OFFICE
CERTIFICATE OF CORRECTION

PATENT NO. : 5,666,217
DATED : September 9, 1997
INVENTOR(S) : SHUZO KANEKO, ET AL.

Page 3 of 6

It is certified that error appears in the above-identified patent and that said Letters Patent is hereby corrected as shown below:

COLUMN 14

Line 1, "constitute" should read
--individually constituted--.

COLUMN 15

Line 57, "electroconductivity controlling" should read
--electroconductivity-controlling--.

COLUMN 16

Line 60, "a film," should read --when a film 6 (--; and
Line 61, "film, 6" should read --film)--.

COLUMN 19

Line 15, "If" should read --In case of--.

COLUMN 20

Line 2, "zirconiumoxide" should read --zirconium oxide--; and
Line 66, "Cl" should read --cl--.

COLUMN 23

Line 2, "asymmetry" should read --asymmetry,--.

UNITED STATES PATENT AND TRADEMARK OFFICE
CERTIFICATE OF CORRECTION

PATENT NO. : 5,666,217

DATED : September 9, 1997

INVENTOR(S) : SHUZO KANEKO, ET AL.

It is certified that error appears in the above-identified patent and that said Letters Patent is hereby corrected as shown below:

COLUMN 24

Line 1, "d" should read --d1--.

COLUMN 25

Table 2, "(polysiloxane)-" should read --(polysiloxane- --;
Table 2, "V)" should read --(V)--;
Table 2, "(polysiloxane)-" should read --(polysiloxane- --;
Table 2, "+0" should read --0--;
Table 2, "$\gamma_{DP}$" (first occurrence) should read --$\gamma_{DP}{}^*$--;
Line 27, "identical-polarities" should read
--identical polarities--; and
Line 33, "below" should read --below)--.

COLUMN 26

Line 2, "Å/thick" should read --Å-thick--;
Line 28, "mTorr" should read --Torr--;
Line 34, "film" should read --film 94--; and
Line 63, "grounds" should read --ground--.

COLUMN 27

Line 56, ". under" should read --, under--;
Line 61, "0.1" should read --0.1%--; and
Line 67, "layers" should read --layer--.

COLUMN 28

Line 39, "condition" should read --conditions--.

UNITED STATES PATENT AND TRADEMARK OFFICE
CERTIFICATE OF CORRECTION

PATENT NO. : 5,666,217

DATED : September 9, 1997

INVENTOR(S) : SHUZO KANEKO, ET AL.

It is certified that error appears in the above-identified patent and that said Letters Patent is hereby corrected as shown below:

COLUMN 29

Line 39, delete "0"; and
Line 51, "polyamide-alignment" should read
--polyamide alignment--;

COLUMN 30

Line 18, "switch" should read --switching--.

COLUMN 31

Line 17, "nun" should read --mm--.

COLUMN 32

Line 24, "for" should read --for 1--; and
Line 66, "condition" should read --conditions--.

COLUMN 33

Line 7, "⊙:0.2" should read --⊙:≤0.2--;
Line 9, "50" should read --50%--; and
Line 47, "substrate-having" should read
--substrate having--.

COLUMN 34

Line 43, "substrate" should read --substrates--.

UNITED STATES PATENT AND TRADEMARK OFFICE
CERTIFICATE OF CORRECTION

PATENT NO. : 5,666,217
DATED : September 9, 1997
INVENTOR(S) : SHUZO KANEKO, ET AL.

It is certified that error appears in the above-identified patent and that said Letters Patent is hereby corrected as shown below:

COLUMN 35

Line 66, "crystal, contacting" should read --crystal-contacting--.

COLUMN 36

Line 8, "A" should read --A liquid crystal device according to Claim 36,--;
Line 9, delete "36, where said film provided to the second substrate";
Line 24, "herein" should read --wherein--; and
Line 61, "claim 48" should read --claim 50--.

Signed and Sealed this

Third Day of March, 1998

Attest:

BRUCE LEHMAN

*Attesting Officer*  *Commissioner of Patents and Trademarks*